United States Patent
Lacroix et al.

(10) Patent No.: US 12,046,398 B2
(45) Date of Patent: Jul. 23, 2024

(54) METHOD FOR PRODUCING A PERMANENT OR SOFT MAGNET

(71) Applicants: INSTITUT NATIONAL DES SCIENCES APPLIQUÉES, Toulouse (FR); UNIVERSITE PAUL SABATIER TOULOUSE III, Toulouse (FR); CENTRE NATIONAL DE LA RECHERCHE SCIENTIFIQUE, Paris (FR)

(72) Inventors: Lise-Marie Lacroix, Toulouse (FR); Guillaume Viau, Toulouse (FR); Thierry Leichle, Toulouse (FR); Pierre Moritz, Toulouse (FR)

(73) Assignees: INSTITUT NATIONAL DES SCIENCES APPLIQUÉES, Toulouse (FR); UNIVERSITE PAUL SABATIER (TOULOUSE III), Toulouse (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 310 days.

(21) Appl. No.: 17/413,855

(22) PCT Filed: Dec. 12, 2019

(86) PCT No.: PCT/FR2019/053046
§ 371 (c)(1),
(2) Date: Jun. 14, 2021

(87) PCT Pub. No.: WO2020/120913
PCT Pub. Date: Jun. 18, 2020

(65) Prior Publication Data
US 2022/0059261 A1   Feb. 24, 2022

(30) Foreign Application Priority Data
Dec. 14, 2018   (FR) .................................. 18/72920

(51) Int. Cl.
*H01F 7/02* (2006.01)
*H01F 1/053* (2006.01)
(Continued)

(52) U.S. Cl.
CPC ......... *H01F 1/0551* (2013.01); *H01F 1/0536* (2013.01); *H01F 1/08* (2013.01); *H01F 7/021* (2013.01)

(58) Field of Classification Search
None
See application file for complete search history.

(56) References Cited

U.S. PATENT DOCUMENTS

2007/0155025 A1   7/2007 Zhang et al.
2016/0159653 A1*  6/2016 Carpenter ............. C01B 32/914
                                                424/646

FOREIGN PATENT DOCUMENTS

WO    2004/088695 A1   10/2004

OTHER PUBLICATIONS

Fragouli (ACS Nano, vol. 4, No. 4, p. 1873-1878, 2010). (Year: 2010).*

(Continued)

*Primary Examiner* — Xiaowei Su
(74) *Attorney, Agent, or Firm* — Oliff PLC

(57) ABSTRACT

A method for producing a permanent or soft magnet including the following steps: a) providing: a solution containing a solvent in which are dispersed a set of objects which possess a permanent magnetic moment; a substrate on which are fixed to the surface or within a cavity that it may have, a 1st pad and a 2nd pad, said 1st pad includes a face facing and parallel to a face that the 2nd pad includes; b) the solution is deposited on the surface of the substrate or, as the case may be, within its cavity; c) the substrate is placed in a magnetic field so that the set of objects are grouped (Continued)

together between the face of the 1st pad and the face of the 2nd pad so as to form a permanent magnet.

16 Claims, 10 Drawing Sheets

(51) Int. Cl.
    *H01F 1/055*     (2006.01)
    *H01F 1/08*     (2006.01)

(56) References Cited

OTHER PUBLICATIONS

Anagnostopoulou (Nanoscale, vol. 8, p. 4020-4029, 2016). (Year: 2016).*

Apr. 8, 2020 International Search Report issued in International Patent Application No. PCT/FR2019/053046.

Jun. 8, 2021 International Preliminary Report on Patentability issued in International Patent Application No. PCT/FR2019/053046.

Weiqing Fang et al.; "Optimization of the magnetic properties of aligned Co nanowires/polymer composites for the fabrication of permanent magnets"; Journal of Nanoparticles Research; Jan. 2014; vol. 16; No. 2; pp. 1-10.

Semih Ener et al; "Consolidation of cobalt nanorods: A new route for rare-earth free nanostructured permanent magnets"; Acta Materialia; Feb. 2018; vol. 145; pp. 290-297.

Yaghoub Soumare et al; "Kinetically Controlled Synthesis of Hexagonally Close-Packed Cobalt Nanorods with High Magnetic Coercivity"; Advanced Functional Materials; Jun. 2009; vol. 19; No. 12; pp. 1971-1977.

Sumeet S. Kale et al.; "Iron carbide or iron carbide/cobalt nanoparticles for magnetically-induced $CO_2$ hydrogenation over Ni/SiRAlOx catalyst"; The Royal Society of Chemistry; 2019; vol. 9; pp. 2601-2607.

* cited by examiner

[FIG. 1]
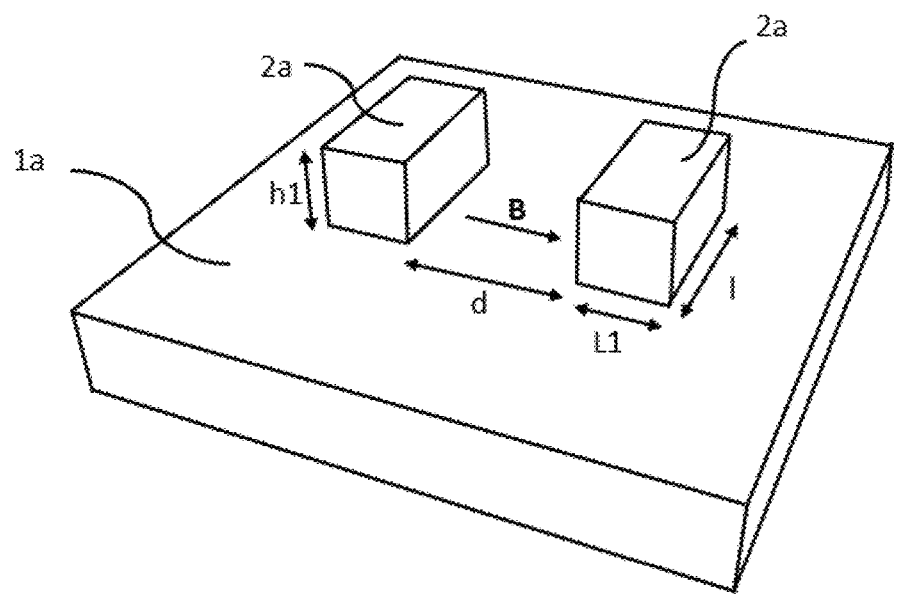
[FIG. 2]
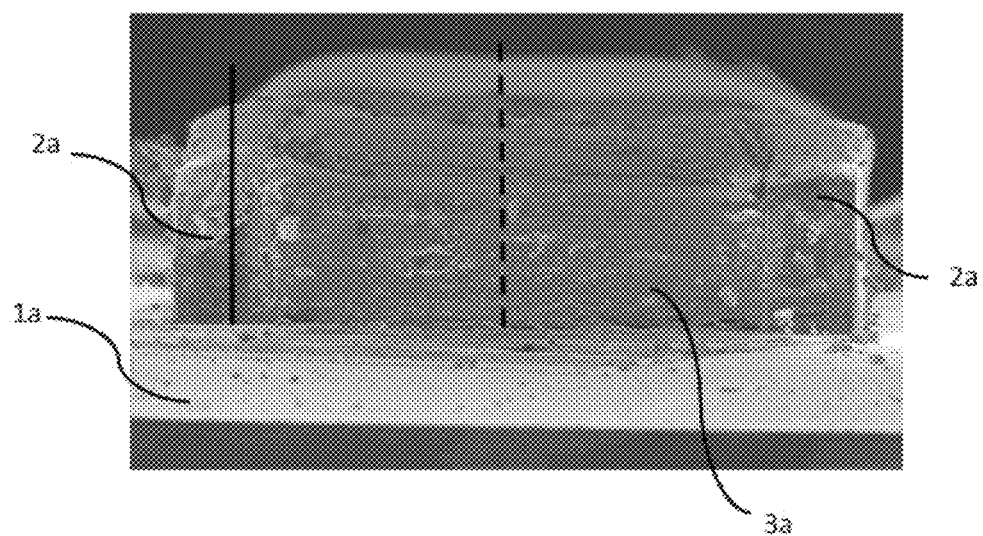

[FIG. 3]
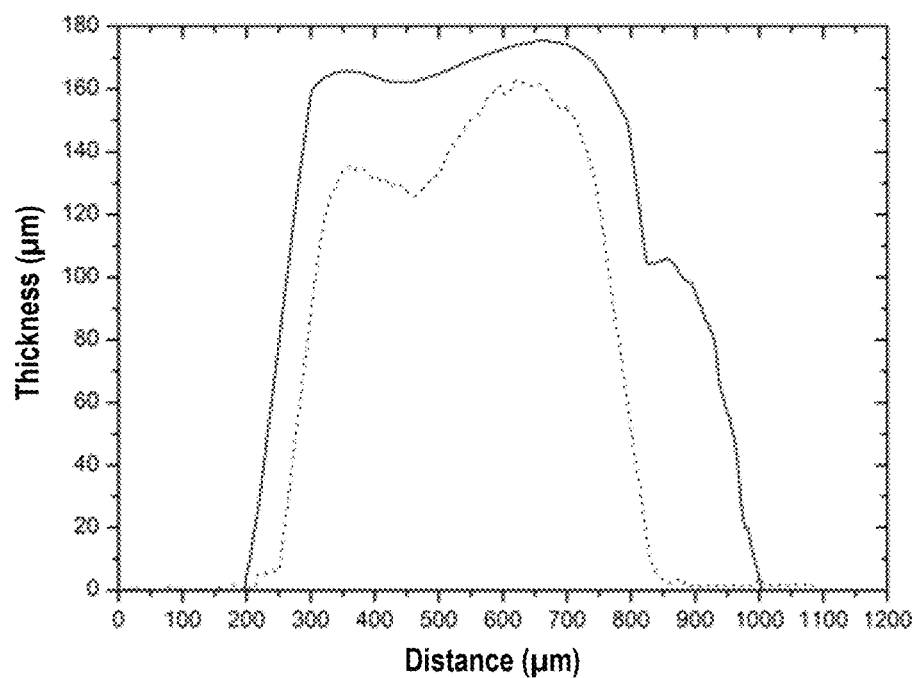
[FIG. 4]
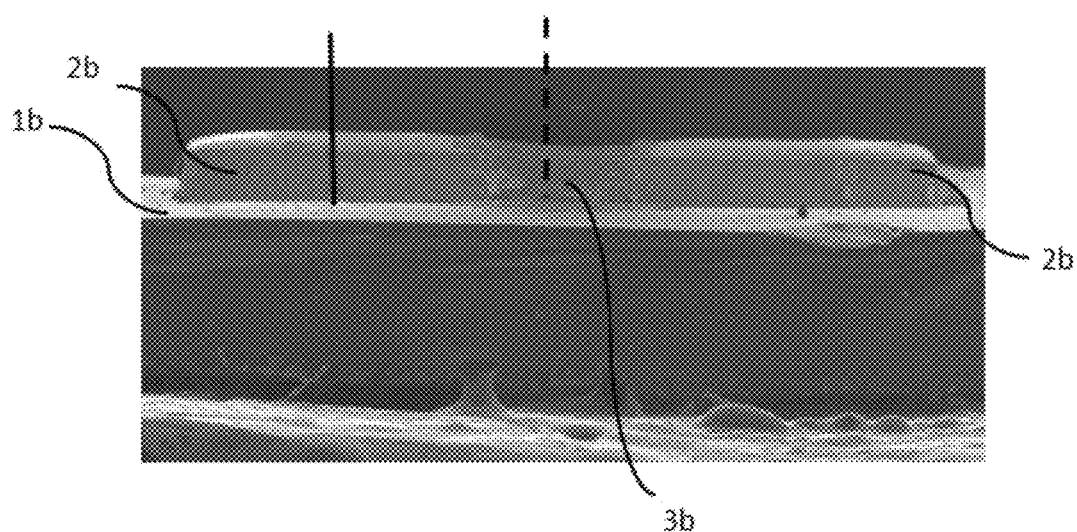

[FIG. 5]
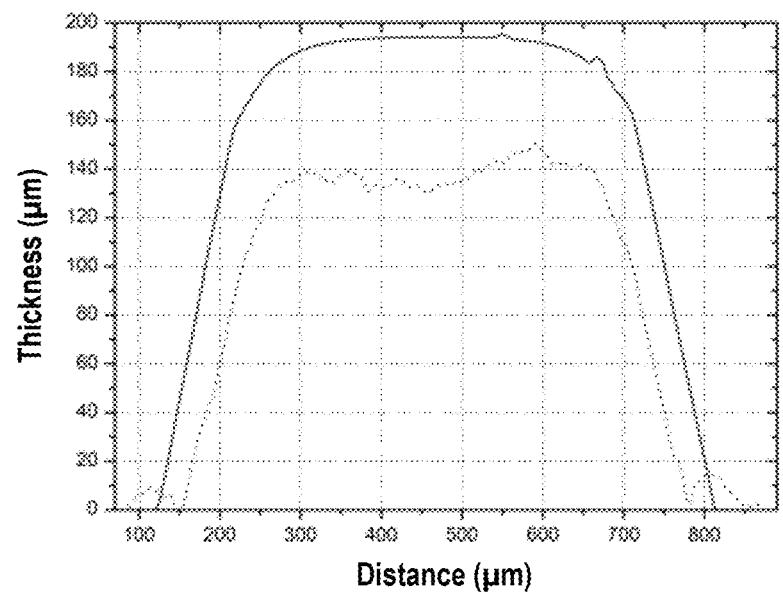
[FIG. 6]
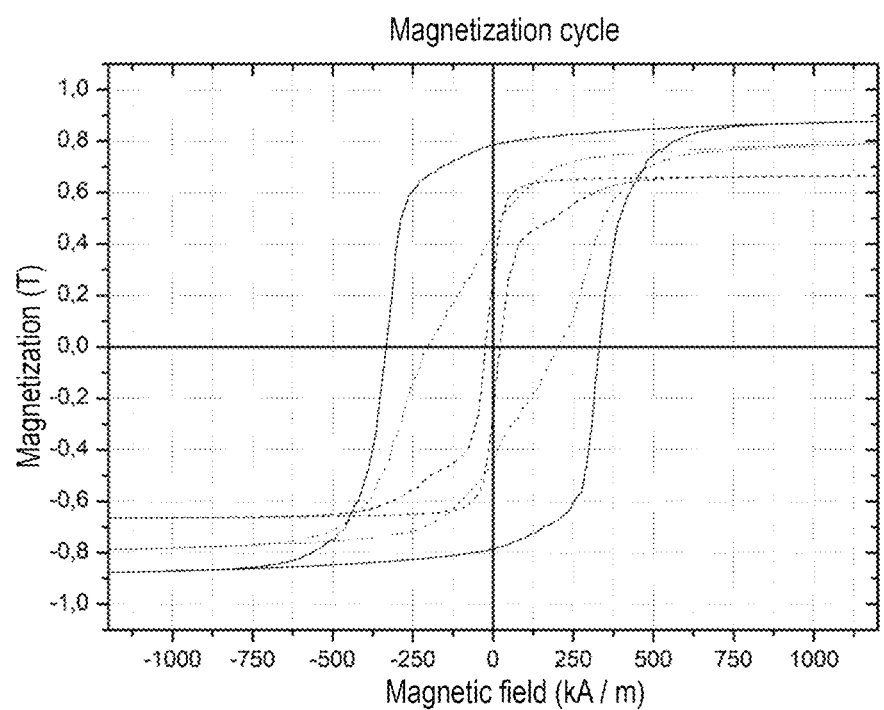

[FIG. 7]
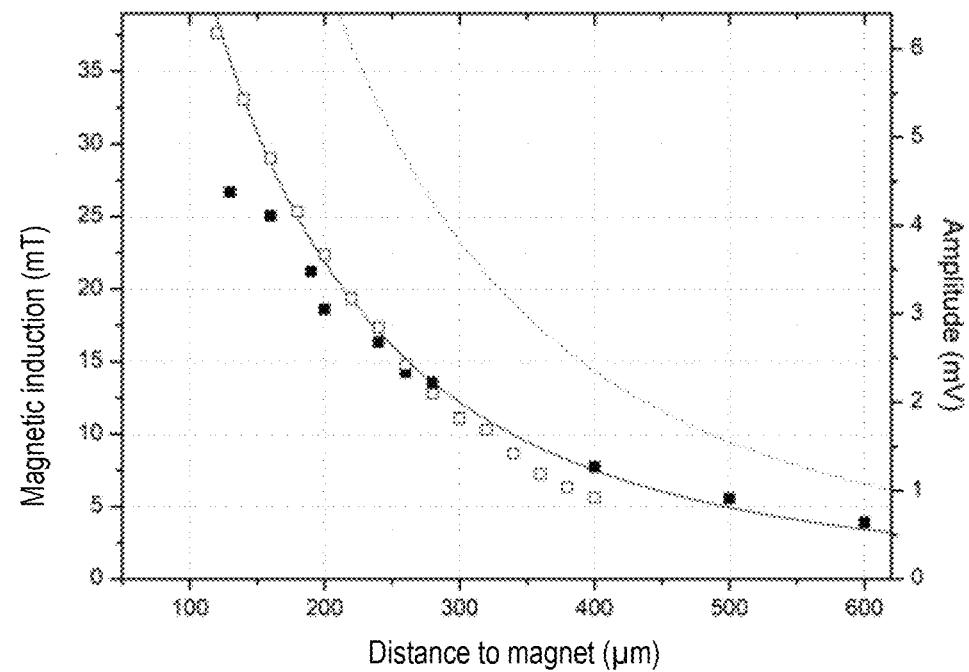
[FIG. 8]
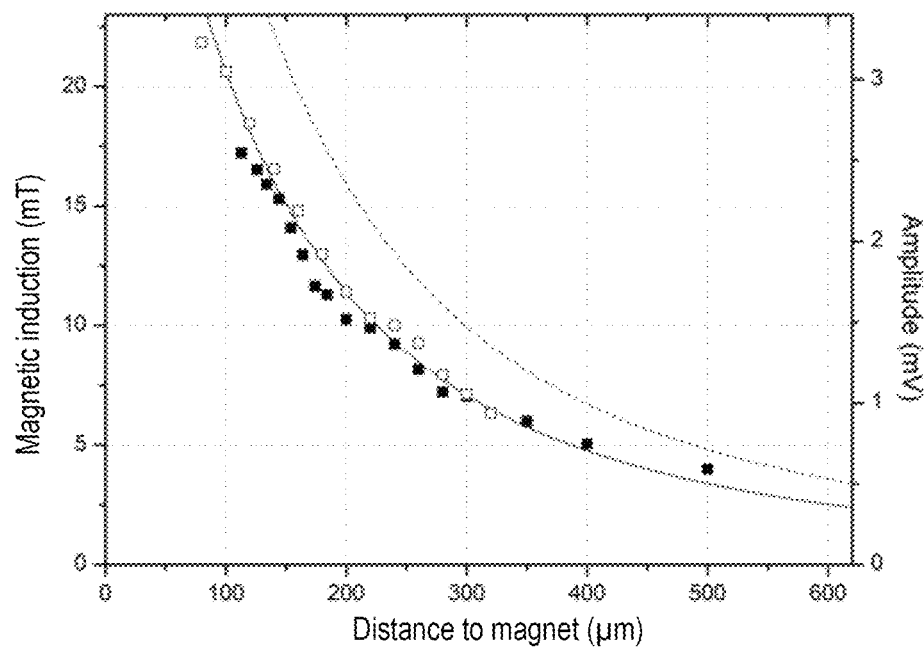

[FIG. 9]
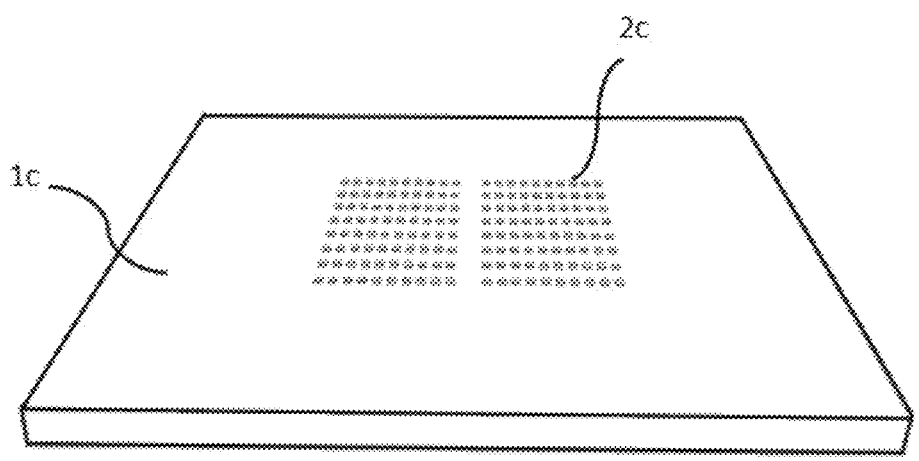
[FIG. 10]
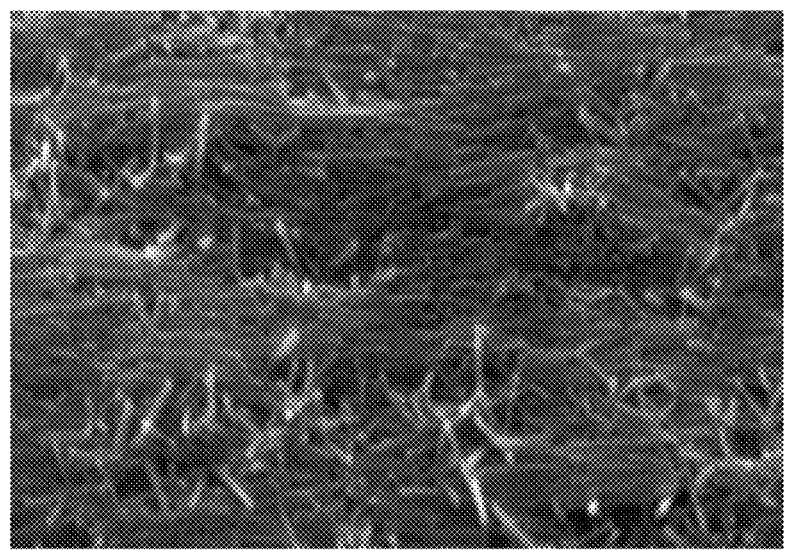

[FIG. 11]
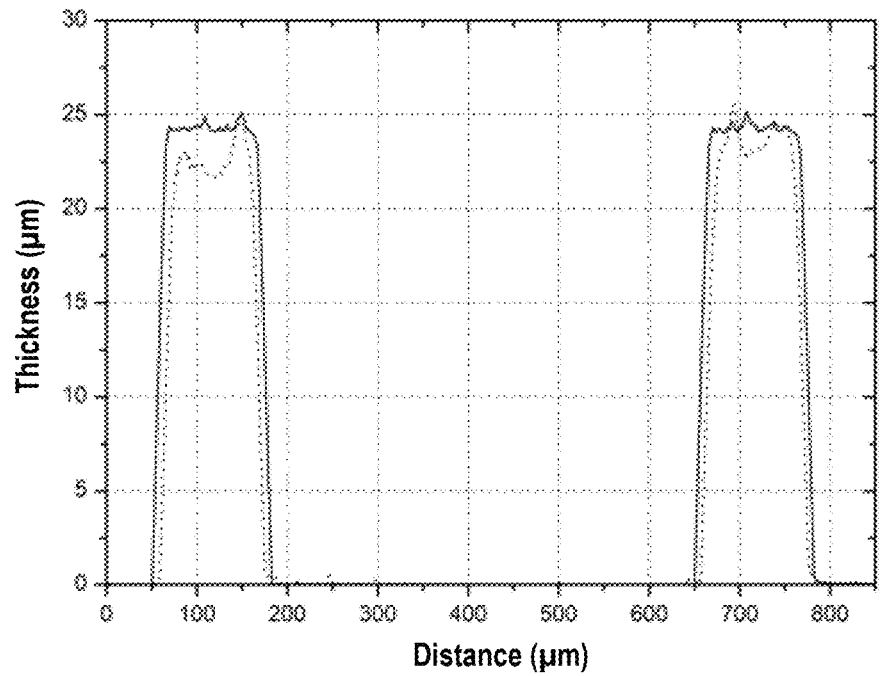
[FIG.12]
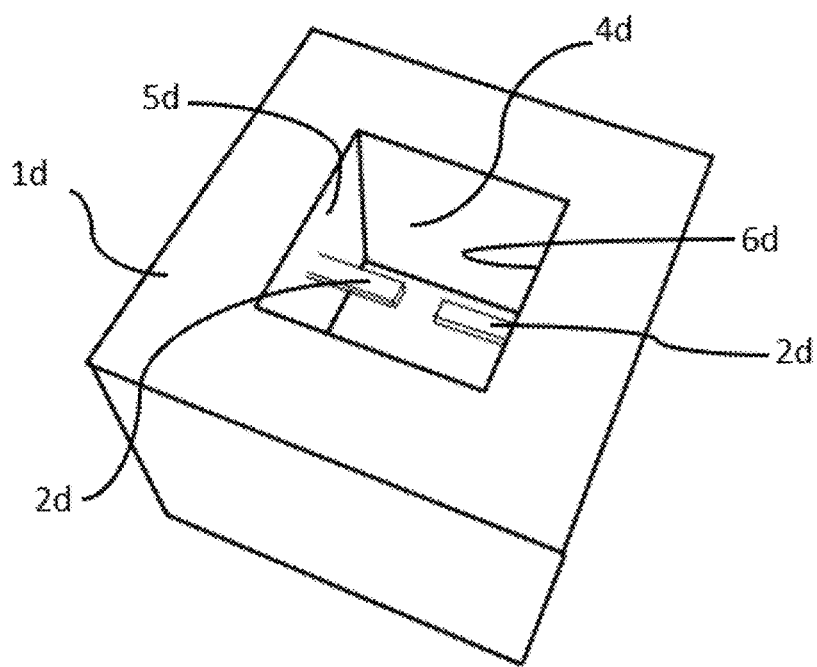

[FIG. 13]
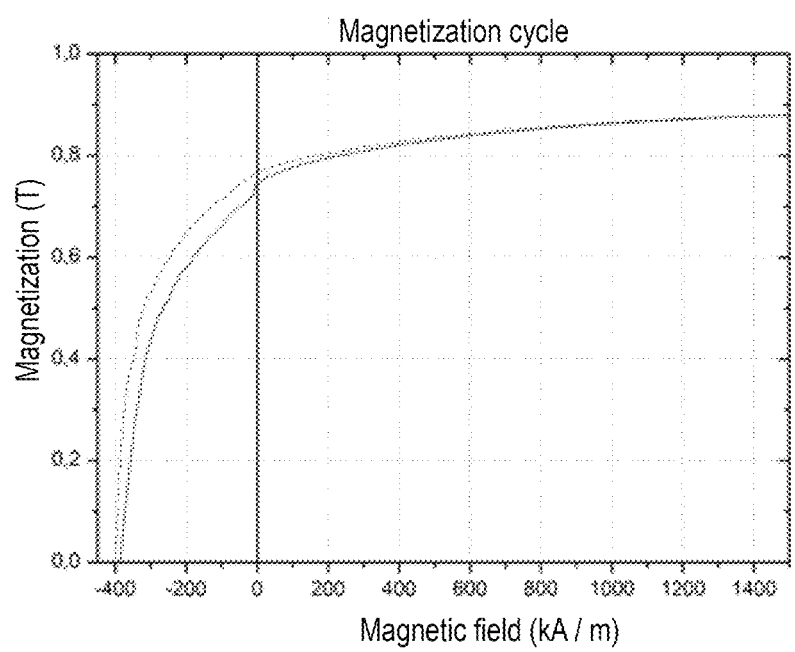
[FIG. 14]
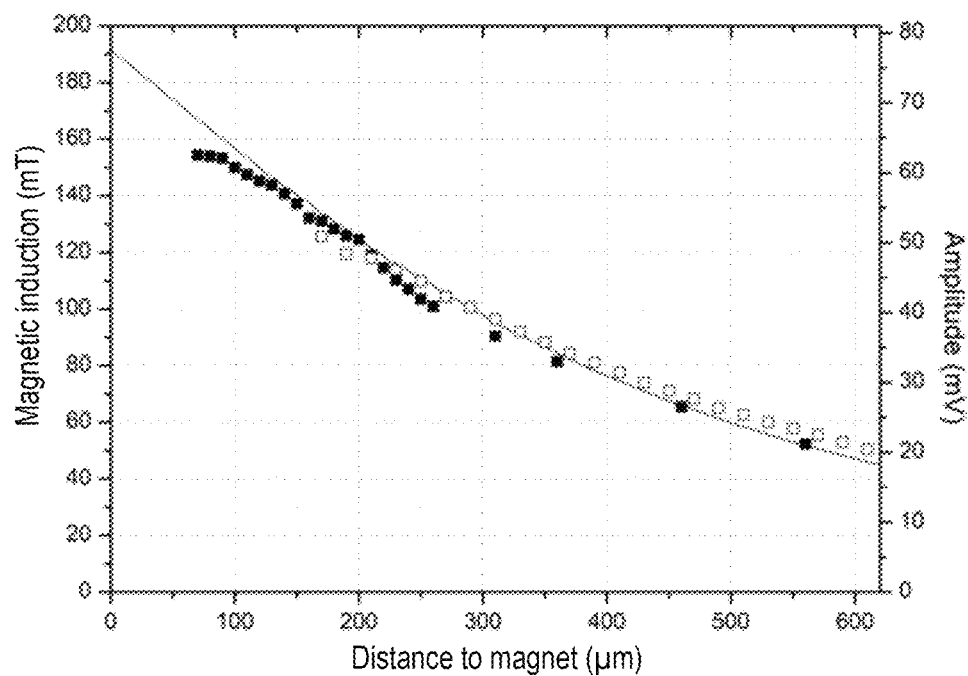

[FIG. 15]
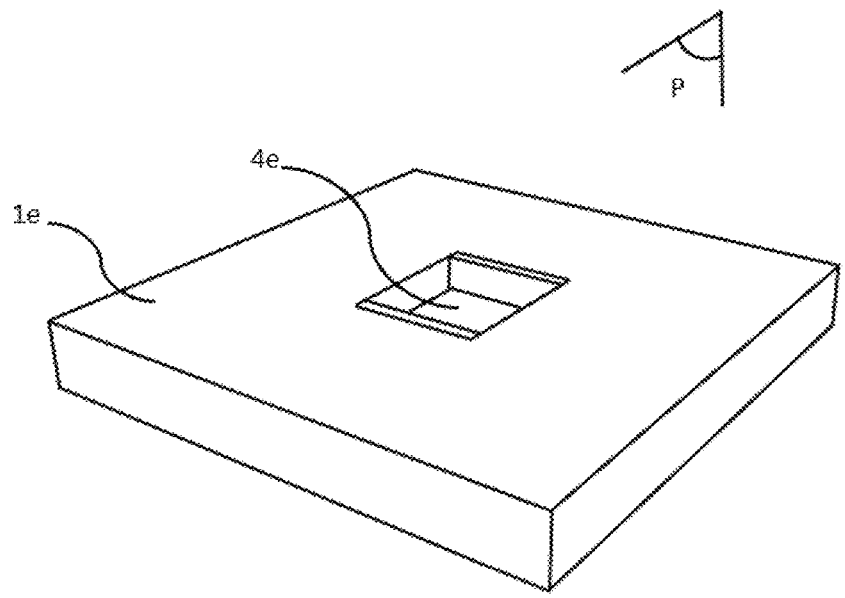
[FIG. 16]
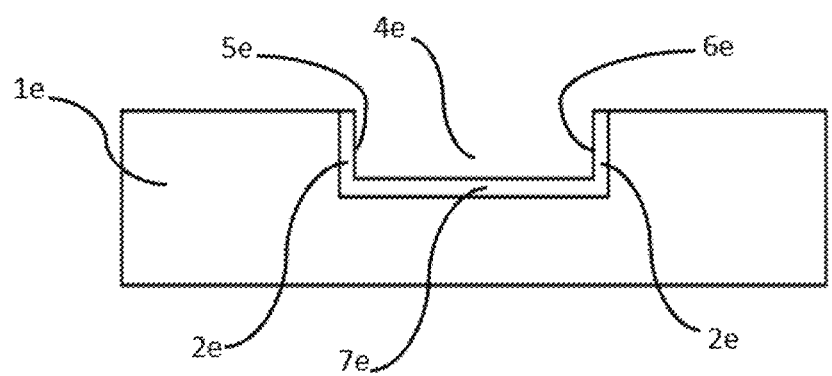

[FIG. 17]
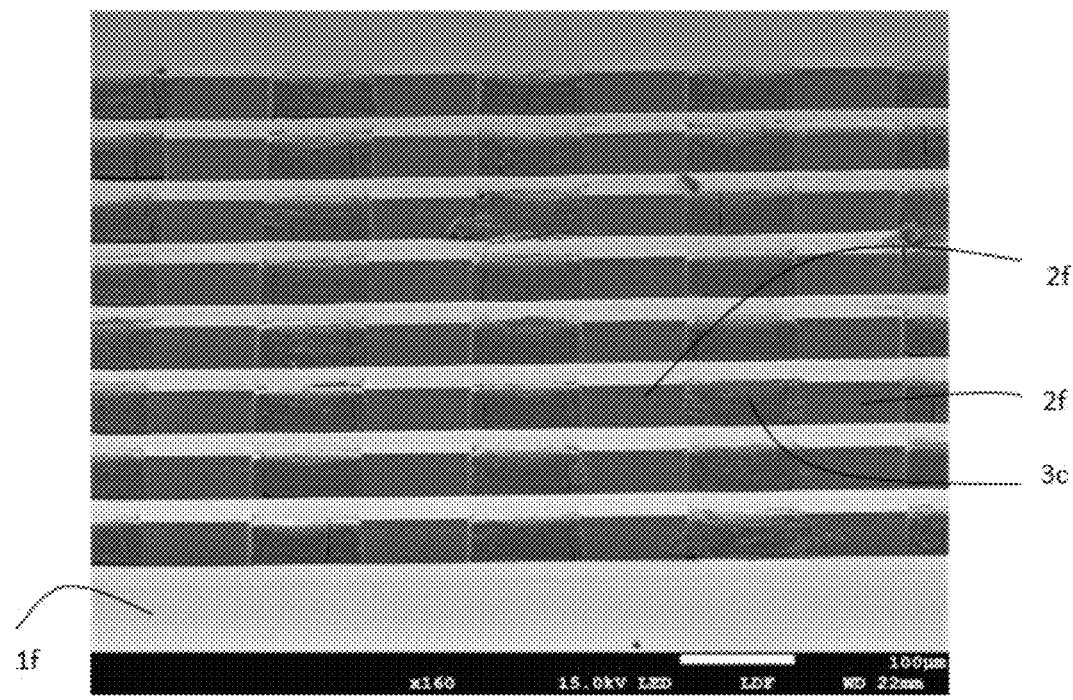
[FIG. 18]
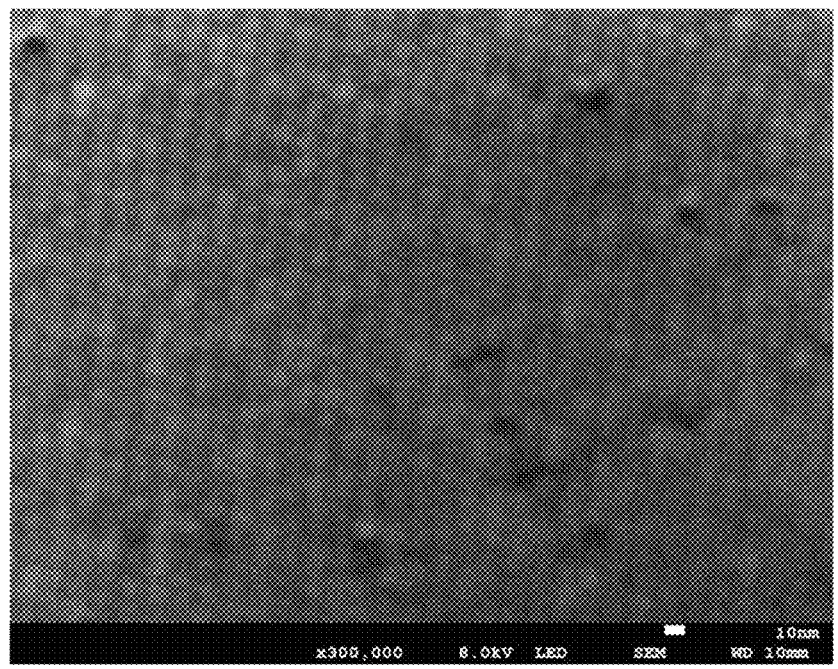

[FIG. 19]
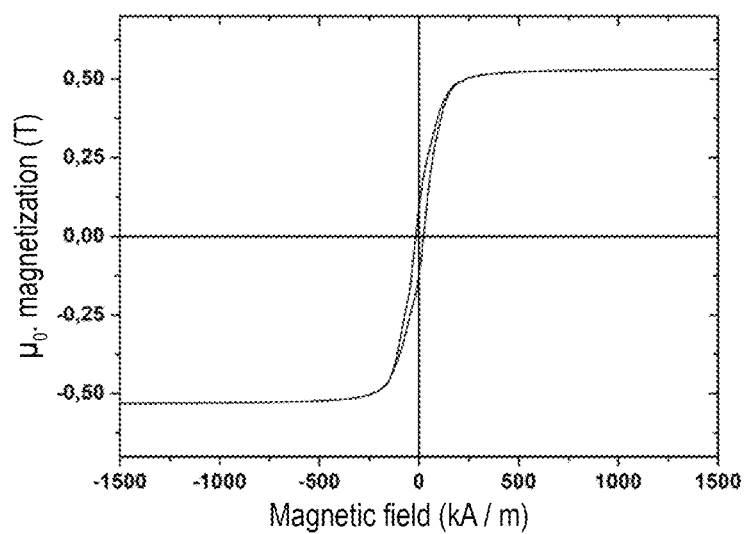

METHOD FOR PRODUCING A PERMANENT OR SOFT MAGNET

The invention concerns a method for producing a permanent or soft magnet.

A permanent magnet is an object made from a ferromagnetic material. It has a natural magnetization present in the absence of an external magnetic field, as well as a high coercive field and remanence.

Many micro electromechanical systems hereinafter called «MEMS» include permanent magnets, the whole forming magnetic micro electromechanical systems, hereinafter designated with the abbreviation «MAGMEMS».

MAGMEMS can be any type of MEMS sensor and actuator with electromagnetic transduction. For example, it can be a magnetic field sensor, an energy collector or a relay.

These MAGMEMS are used in a wide variety of applications:
- in microbiology, in particular for magnetic microfluidic separation (for example biosensors),
- in telecommunications (for example radiofrequency micro-switches),
- in automotive sensors.

Furthermore, permanent magnets can be used in magneto-optical devices such as:
- the magneto-optical sensors (for example fiber optic sensors, rotary sensors and polarimetric sensors);
- the deflectors;
- the modulators (for example microwave modulators);
- the non-reciprocal components (for example insulators and circulators).

In view of the multitude of applications, permanent magnets have become essential objects of everyday life and thus represent a substantial market with a promising future.

Until recently, the main source of permanent magnet materials were rare earth based alloys (for example scandium, yttrium and the 15 lanthanides such as neodymium and samarium) which have the advantage of providing the better magnetic performance. A well-known example of a rare earth permanent magnet is the NdFeB magnet, also known as the «Neo magnet» which is made of an alloy of neodymium (Nd), iron (Fe) and boron (B).

However, the extraction of rare earths is difficult and poses environmental problems. This is why the current trend is to move away from these materials and look for substitute materials that are also efficient.

Furthermore, the method for producing permanent magnets from rare earths is complex. For example, the production of an NdFeB magnet requires the following steps: melting, then grinding the raw materials or decrepitation with hydrogen, molding in a magnetic field and sintering. Next, the magnet blanks must be machined and polished to the desired size and shape. Finally, a surface treatment, for example by galvanizing so as to coat the magnet with a nickel-copper-nickel layer, is necessary in order to prevent the magnet from oxidizing and decomposing into dust. Also, the limitations of the machining performance do not allow obtaining permanent magnet sizes that are suitable for microelectronics applications.

In addition, this producing method requires a temperature of 1000° C. and high pressures which are not compatible with the MEMS production steps. This then requires producing the magnet separately from the rest of the MEMS, then integrating it into the MEMS: which is tedious to implement in production lines and requires that the magnet has a macroscopic scale. Indeed, magnets on a microscopic scale cannot be easily integrated in this way with MEMS: it requires very complex handling steps.

Moreover, barium and strontium hexaferrites are the cheapest source of permanent magnet material. However, due to their weaker magnetization, they do not perform as well magnetically as rare earth permanent magnets.

This is why we are always on the lookout for new permanent magnet materials:
- devoid of rare earths, and which further
- have good magnetic properties,
- can be manufactured at low cost and easily in production lines, and
- can be integrated into MEMS or magneto-optical devices as detailed above during the production of these MEMS and devices. This requires their integration to take place at low temperature and in a manner compatible with mass production,
- have an appropriate dimensioning (namely in particular a microscopic scale) for possible integration into a production line during the production of MEMS and magneto-optical devices.

In the field of microtechnology, various techniques are known for producing permanent magnets in the form of magnetic layers on a substrate.

Among these techniques, we can mention:
- deposition by laser ablation (also known as «Pulsed Laser Deposition» which makes it possible to obtain a magnetic layer with a maximum thickness of 10 to 20 µm with a quantity of magnetic energy BHmax of 130 kJ/m$^3$. However, the temperature for implementing this technique is 700° C.; which is not compatible with the MEMS.
- sputtering which makes it possible to obtain a magnetic layer having a quantity of magnetic energy BHmax of 400 kJ/m$^3$ but which also requires an annealing temperature comprised between 400° C.–700° C. incompatible with MEMS and which presents limitations as to the achievable thickness: in the range of a few micrometers, and a maximum of 50 µm. Thus, greater thicknesses, for example in the range of 100-1000 µm, are not conceivable with this technique, and this whereas they are very desirable for MEMS, for example to create a deflection.
- the encapsulation of isotropic powder in a polymer matrix. The resulting polymer can then be shaped by molding, spinning or screen printing. This allows obtaining a magnetic layer with a maximum thickness of 400 µm with a quantity of magnetic energy BHmax of 53 kJ/m$^3$. However, the significant dilution of the magnetic powders in the polymer leads to a significant drop in the macroscopic properties of the obtained magnet. In addition, the conventionally used screen printing deposition method poses problems for large-scale industrialization. Furthermore, difficulties with the homogeneity of the magnetic powder within the matrix may arise. All these drawbacks thus limit the value of this technique.
- physical vapor deposition (known by the acronym «PVD» for «Physical Vapor Deposition») which allows obtaining a magnetic layer with a maximum thickness of 10 µm with a quantity of magnetic energy BHmax of 120 kJ/m$^3$. This technique is not fully satisfactory for certain applications, due to the limitation of the thickness of the magnetic layer to only 10 µm.
- electrodeposition, which is a technique compatible with MEMS but which produces materials whose micro-structure is not optimized for permanent magnets, and whose BHmax is limited to 30 kJ/m³.

Thus, apart from the fact that these various techniques may, for some of them (in particular sputtering), be expensive to implement, they are not always fully satisfactory as regards the thickness of the obtained magnetic layers and/or their magnetic properties for various applications in microtechnology as well as, as the case may be, due to the incompatibility of their method for obtaining MEMS.

A soft magnet is distinguished from a permanent magnet by the fact that it has a weak coercive field while having a strong saturation magnetization.

The soft magnets can be used in microelectronics, in high frequency components, such as inductors, common mode filters, or even radiofrequency transformers, which generally comprise magnetic materials.

The advantage of forming soft magnets based on spherical nanoparticles is, among other things, the possibility of having materials with properties in the high frequency range (>GHz) because their diameter is less than the skin thickness (which decreases as the frequency increases).

Dense assemblies of spherical nanoparticles made of a soft material (Fe, FeCo, FeNi, FeC, FeN . . . ) are interesting because they present both a strong magnetization (linked to the nature of the particles and to their volume fraction in assembly) and strong magnetic susceptibilities in the microwave range.

For the purposes of the present application, the term «soft material» means an object made from a ferromagnetic material which has a high magnetic susceptibility at the desired frequency and a strong magnetization at saturation.

Thus, as with permanent magnets, soft magnets have become essential objects of daily life and represent a significant market with a promising future.

A known soft magnet fabrication technique is that of depositing composite materials in thin layers by sputtering or electrodeposition. Nonetheless, this technique has significant limits due in particular to the losses due to Foucault currents, thermal and pressure constraints, the low magnetic content and their transfer, usually carried out by the pick-and-place technique.

Thus, the known soft magnet producing techniques are not always satisfactory as regards the density of the obtained magnetic material and/or as regards their compatibility with micro-producing techniques.

The inventors of the present invention have overcome all these drawbacks detailed above with regard to the production of permanent or soft magnets for applications in particular in microtechnology. They have in fact developed a method for producing a permanent or soft magnet which:

is easy to implement, at room temperature;
is economical in raw materials;
offers a variety of sizes: the size of the magnet thus obtained can be between micrometric and millimeter scale;
for a permanent magnet, can be integrated both in a MEMS so as to obtain a MAGMEMS and in a magneto-optical device as detailed above, as well as in fluidic chips and biochips with magnetic function;
for a permanent magnet, can be implemented during the production of a MEMS or a magneto-optical device or in fluidic chips and biochips with magnetic function or, if necessary, can be produced independently of the rest of MEMS or magneto-optical device or fluidic chips and biochips with magnetic function and then be integrated within the MEMS or magneto-optical device or fluidic chips and biochips with magnetic function;
for a soft magnet, allows increasing the density of the obtained magnetic material and is compatible with micro-producing techniques.

In addition, the permanent magnet obtained with the producing method exhibits magnetic properties perfectly suited for magneto-optical applications, as well as microbiology, telecommunications and automotive sensors detailed above. The soft magnet obtained with the producing method exhibits magnetic properties perfectly suited for the microelectronics applications detailed above.

The subject of the invention is therefore a method for producing a permanent or soft magnet which is characterized in that it comprises at least the following steps:

a) providing:
a solution containing at least one solvent in which are dispersed a set of objects which possess a permanent magnetic moment;
a substrate on which are fixed to the surface or within a cavity that it may have, at least a $1^{st}$ pad and a $2^{nd}$ pad which are made of a ferromagnetic material, said $1^{st}$ pad includes a face facing a face which the $2^{nd}$ pad includes, said facing faces being mutually parallel;

b) the solution is deposited on the surface of the substrate or, as the case may be, within the cavity, so that the $1^{st}$ and $2^{nd}$ pads are at least partly immersed in said solution;

c) the substrate is placed in a magnetic field oriented in a direction perpendicular to the faces of the $1^{st}$ pad and of the $2^{nd}$ pad which are facing and parallel to each other so that at least part of the set of objects are grouped together between said face of the $1^{st}$ pad and said face of the $2^{nd}$ pad which are facing and parallel to each other and that each of these objects is oriented in the direction of the applied magnetic field, so as to form a permanent or soft magnet;

d) optionally, at least one washing of the substrate is carried out with at least one solvent;

e) optionally, the at least one dispersion solvent is totally or partially evaporated from the set of objects and, as the case may be, the at least one washing solvent.

Thus, during the producing method, at least part of the set of objects which each possess a permanent magnetic moment are grouped together by magnetophoresis between the face of the $1^{st}$ pad and the face of the $2^{nd}$ pad which are facing and parallel to each other so as to obtain a permanent or soft macroscopic magnet between these two pads.

The principle of magnetophoresis-directed assembly is based on the displacement of magnetic objects within a colloidal suspension in the presence of a non-uniform magnetic field. Objects are attracted to positive magnetic field gradients, they are assembled and compacted as the solvent evaporates. The application of the magnetic field therefore has two effects. The magnetic field creates a torque on the magnetic moment carried by the objects which aligns them in the direction of the field, and the positive magnetic field gradients created by the ferromagnetic pads on the support allow these objects to be displaced and densely located.

Thanks to the two pads made of ferromagnetic material, at least part of the set of objects which possess a permanent magnetic moment are structured between these two pads during step c) so that this part of the objects set form a permanent or soft magnet. In other words, the permanent or soft magnet obtained at the end of the producing method results from the spatial structuring of at least part of the set of objects that possess a magnetic moment. This spatial structuring is obtained thanks to the two pads made of ferromagnetic material which have two faces facing and parallel to each other and to the application of a magnetic field which is oriented in a direction perpendicular to these two faces.

In one embodiment of the invention, in step c), the set of objects are grouped together between said face of the $1^{st}$ pad and said face of the $2^{nd}$ pad which are facing and parallel to each other and each of these objects is oriented in the direction of the applied magnetic field, so as to form a permanent or soft magnet.

The producing method according to the invention can be implemented within a device during production, said device being able to be selected from:
- the MAGMEMS (for example for the applications described above),
- the magneto-optical devices (for example those described above),
- the fluidic chips and biochips with magnetic function (for example for cell sorting, separation of biological objects, capture of cells and molecules).

In other possible embodiments of the invention, the permanent or soft magnet is produced independently of the rest of the device into which it will then be integrated. The device in which the permanent magnet will be integrated can be one of those described just above.

Thus, the producing method according to the invention has the advantage of being flexible as to its implementation and can therefore perfectly be adapted to cases which require that the permanent or soft magnet be produced within the device in which it is integrated or on the contrary in cases for which it is necessary for the permanent or soft magnet to be integrated into the device after its production. This flexibility of implementation is not always offered by the techniques for producing permanent or soft magnets of the prior art which were recalled above.

Objects that possess a permanent magnetic moment can be selected from a variety of objects.

As regards their material characteristics, they may be objects which are made of a metal selected from cobalt, iron, nickel or platinum, the carbides of these metals, the nitrides of these metals, considered alone or as a mixture of these (for example mixtures of iron and platinum or of cobalt and platinum are possible, as well as the carbides or nitrides of mixtures of these metals).

For example, for the production of a permanent magnet, one will preferably choose objects made of cobalt, iron, nickel or platinum, considered alone or as a mixture thereof (for example, mixtures of iron and platinum or of cobalt and platinum).

For example, for the production of a soft magnet, one will preferably choose objects made of a soft magnetic material, such as iron, a mixture of iron and cobalt (FeCo), a mixture of iron and nickel (FeNi), iron carbides (FeC), iron nitrides (FeN), considered alone or as a mixture thereof.

With regard to their dimensioning characteristics, preferably said objects are nano-objects. This means that they are a nanoscale size. For example, the nano-objects can be nano-rods or nanoparticles such as isotropic particles with a diameter comprised between 5 and 100 nm.

In an embodiment, said objects are cobalt nano-rods and the magnet is a permanent magnet.

For example, the cobalt nano-rods may have been obtained from a synthesis method which is described in the publication by Soumare et al., Dating from 2009, entitled: «Kinetically controlled synthesis of hexagonally close-packed cobalt nanorods with high magnetic coercivity», Advanced Functional Materials, 19, 1971-1977. This synthesis consists of the reduction of cobalt carboxylates in a solution of 1,2-butanediol containing sodium hydroxide at a temperature of 170° C. for 15 minutes in the presence of ruthenium.

The synthesis of cobalt nano-rods is thus perfectly within the reach of those skilled in the art.

In another embodiment, said objects are spherical iron carbide nanoparticles and the magnet is a soft magnet.

For example, the iron carbide nanoparticles may have been obtained from a synthetic method that is described in the publication S. S. Kale et al., "Iron carbide or iron carbide/cobalt nanoparticles for magnetically-induced CO2 hydrogenation over Ni/SiRAlOx catalysts," Catal. Sci. Technol., Vol. 9, no. 10, pp. 2601-2607, 2019.

The synthesis of iron carbide nanoparticles is thus perfectly within the reach of those skilled in the art.

Before their dispersion in the solution, the objects which possess a permanent magnetic moment (for example the nano-objects) are advantageously washed in order to eliminate any residues, in particular residues of their synthesis (for example excess reagents or secondary reaction products). This makes it possible to obtain objects which possess a permanent magnetic moment free of impurities which could be detrimental to the device in which the permanent or soft magnet is integrated. The step of washing these objects possessing a permanent magnetic moment is well within the reach of those skilled in the art.

In an embodiment of the invention, when said objects are cobalt nano-rods obtained at the end of the synthesis method detailed in the aforementioned publication by Soumare et al., they are advantageously washed, in order to remove the synthetic residues and excess ligands. To do this, one or more successive washings can be carried out with a solvent, for example ethanol or chloroform. The solution thus obtained is mechanically stirred, then placed in an ultrasonic bath, so that the particles are redispersed. Said particles are then magnetically attracted and the supernatant is removed.

By way of example, in an embodiment of the invention, 540 mg of cobalt nano-rods dispersed in 120 mL of 1,2-butanediol were obtained from the synthesis method described in the aforementioned publication by Soumare et al. This corresponds to a molar concentration of cobalt of 0.08 mol/L. Then, a volume comprised between 4 and 10 mL of this solution of cobalt nano-rods is taken, which is washed as follows: a volume of 10 mL of solvent (ethanol or chloroform) is added to it. The resulting solution is mechanically stirred for 20 seconds, then placed in an ultrasonic bath for 5 minutes. The particles are magnetically attracted and the supernatant is removed. These steps are repeated 4 to 6 times, for example 2 to 3 times with ethanol and 2 to 3 times with chloroform.

Objects which possess a permanent magnetic moment are dispersed in a solution which contains at least one solvent.

The dispersion solvent is advantageously selected from those which exhibit the following properties, taken alone or in combination thereof:
- good dispersal capacity of objects which possess a permanent magnetic moment;
- the following evaporation characteristics: total evaporation at ambient temperature and under atmospheric pressure or total evaporation under vacuum and/or at a moderate temperature (namely less than about 100° C.), after a maximum of about one hour.

Furthermore, the dispersion solvent is preferably selected from the solvents which can be implemented during the production of MEMS or magneto-optical devices, fluidic chips and biochips with magnetic function, and without risk of deteriorating them.

This dispersion solvent can in particular be selected from anisole, chloroform, toluene, chlorobenzene and mesitylene, considered alone or as mixtures thereof.

The concentration of objects which possess a permanent magnetic moment in the solution can be comprised between $5.10^{15}$ objects/L and $10^{18}$ objects/L, preferably between $5.10^{16}$ objects/L and $2.10^{17}$ objects/L.

In an embodiment of the invention, when said objects which possess a permanent magnetic moment have a cylindrical shape with a length of 100 nm and a diameter of 15 nm, the volume fraction of said objects in the solution is comprised between 0.01% and 10% and preferably between 0.1% and 2%.

In the example described above of cobalt nano-rods, the volume of the dispersion solvent can be comprised between 300 µL and 2.5 mL. This makes it possible to obtain a molar concentration of cobalt comprised between 0.13 mol/L and 2.7 mol/L in the solution. In this embodiment of the invention, the solvent is preferably anisole.

The substrate can be of a wide variety of shape, size and material.

In an embodiment, the substrate may be a part of the device in which the permanent magnet obtained at the end of the method according to the invention is integrated. Thus, it may be part of a MAGMEMS, a magneto-optical device, a fluidic chip or a biochip with magnetic function.

As will be explained below, the pads can be fixed on the substrate by electrodeposition. Therefore, in embodiments of the invention, the substrate is selected from substrates suitable for electrodeposition.

The substrate is made of a non-ferromagnetic material which is compatible with the solvent in which the set of objects which possess a permanent magnetic moment are dispersed.

The substrate can be made from a material selected from silicon (optionally functionalized with molecules such as octadecyltrichlorosilane or perfluorodecyltrichlorosilane), glass, polymers not soluble in organic solvents (for example polytetrafluoroethylene, hereinafter abbreviated «PTFE»), metals and silica.

At least 2 pads are fixed on the substrate. As explained above, the 2 pads can be fixed to the surface of the substrate or else within a cavity that said substrate may include.

In an embodiment of the invention, a plurality of pads are fixed to the substrate such that each pad has at least one face facing a face of at least one other pad, these facing faces being all parallel to each other. This has the advantage of making several permanent magnets at the same time.

The two facing faces of two pads can be spaced apart by a distance comprised between 10 µm and 1 cm, preferably between 50 µm and 1 mm.

The pads are made of a ferromagnetic material. This ferromagnetic material can be selected from nickel, cobalt, steel, alloys of nickel and iron (for example permalloy), alloys of iron and cobalt, alloys of iron and platinum, alloys of cobalt and platinum, alloys of nickel and iron and alloys of nickel, cobalt, manganese and phosphorus, considered alone or as a mixture thereof.

In a $1^{st}$ embodiment of the invention, the pads are fixed to the surface of the substrate. For example, they can be fixed by electrodeposition, cathodic sputtering or atomic layer deposition.

In this $1^{st}$ embodiment of the invention, the pads can be fixed to the surface of the substrate by means of a tie layer. This tie layer can be implemented in particular when the pads are fixed by electrodeposition to the surface of the substrate. For example, this tie layer consists of the superposition of a layer of copper on a layer of titanium.

In this 1st embodiment of the invention in which the pads are fixed to the surface of the substrate:
- the substrate can have any three-dimensional shape. For example, the substrate may have a base whose area is comprised between 4 mm$^2$ and 2,500 cm$^2$, preferably between 4 cm$^2$ and 100 cm$^2$ and a height measured from this base comprised between 10 µm and 10 cm, preferably between 250 µm and 1 mm,
- the pads can have any three-dimensional shape. For example, the pads can have a base which is fixed to the surface of the substrate and whose area is comprised between 50 µm$^2$ and 1 cm$^2$, preferably between 2500 µm$^2$ and 1 mm$^2$, and a height measured from this base comprised between 10 µm and 1 mm, preferably between 50 µm and 500 µm,
- the two facing and mutually parallel faces of the two pads are advantageously spaced apart by a distance comprised between 10 µm and 1 cm, preferably between 50 µm and 1 mm.

In this 1st embodiment of the invention, the substrate can comprise between 2 and 100, preferably between 2 and 10, pads which are fixed to its surface, each pad having at least one face facing a face of another pad, said facing faces being all parallel to each other. This makes it possible to produce several permanent magnets at the same time.

By way of example of this $1^{st}$ embodiment of the invention, the substrate can be a wafer of a cylindrical shape (made of a material among those described above, for example silicon) and whose diameter is comprised between 4 mm and 50 cm and the height is comprised between 50 µm and 1 mm. The pads are made of a ferromagnetic material (for example one of those described above, in particular nickel) and may have a parallelepipedal shape whose height is 200 µm, the width of 500 µm and the length comprised between 100 µm and 1000 µm.

In a $2^{nd}$ embodiment of the invention, the pads are fixed within a cavity which the substrate includes.

In a $1^{st}$ variant of this $2^{nd}$ embodiment:
- the substrate can have any three-dimensional shape. For example, the substrate may have a base whose area is comprised between 1 mm$^2$ and 100 cm$^2$, preferably between 25 mm$^2$ and 4 cm$^2$, and a height measured from this base comprised between 1 mm and 10 cm, preferably between 5 mm and 2 cm,
- the substrate may have at least one cavity whose volume is comprised between 1 mm$^3$ and 500 cm$^3$, preferably between 125 mm$^3$ and 8 cm$^3$, and a depth comprised between 1 mm and 10 cm, preferably between 5 mm and 2 cm, the pads which are fixed within the cavity of the substrate can have any three-dimensional shape. For example, the pads may have a base which is in contact with the substrate whose area is comprised between 0.01 mm$^2$ and 1000 mm$^2$, preferably between 0.05 mm$^2$ and 50 mm$^2$, and a height measured from this base comprised between 100 µm and 5 mm, preferably between 500 µm and 1 mm,
- the two facing and mutually parallel faces of the two pads are advantageously spaced apart by a distance comprised between 100 µm and 10 mm, preferably between 500 µm and 1 mm.

In this $1^{st}$ variant of the $2^{nd}$ embodiment, the pads can be embedded in the wall of the substrate.

In these embodiments of the invention described just above, the permanent or soft magnet is produced outside of the device in which it will be integrated.

By way of example, in this 1$^{st}$ variant of the 2$^{nd}$ embodiment, the substrate may be made of PTFE and the pads may have a cylindrical shape with a base having the shape of a disc which is fixed to the substrate within its cavity, said pads can be made of steel. The two facing and mutually parallel faces of the two pads therefore have the shape of a disc.

In these embodiments of the invention, the cavity may have a 1$^{st}$ face facing a 2$^{nd}$ face, a plurality of pads being fixed to the 1$^{st}$ face of the cavity and each having a face facing a face of one of the pads of the plurality of pads which is fixed to the 2$^{nd}$ face of the cavity, said facing faces of the pads all being parallel to each other. This has the advantage of producing several permanent or soft magnets at the same time.

In a 2$^{nd}$ variant of this 2$^{nd}$ embodiment in which the pads are fixed within a cavity presented by the substrate:
  the substrate may have any three-dimensional shape. For example, the substrate may have a base whose area is comprised between 4 mm$^2$ and 2,500 cm$^2$, preferably between 4 cm$^2$ and 100 cm$^2$ and a height measured from this base comprised between 10 µm and 10 cm, preferably between 250 µm and 500 µm,
  the substrate may have at least one cavity whose volume is comprised between 500 µm$^3$ and 100 mm$^3$, preferably between 125,000 µm$^3$ and 0.5 mm$^3$, and a depth comprised between 10 µm and 1 mm, preferably between 50 µm and 500 µm,
  at least one 1$^{st}$ pad being fixed on a 1$^{st}$ face of the cavity and includes a face facing and parallel to a face of a 2$^{nd}$ pad fixed on a 2$^{nd}$ face of the cavity,
  said pads may have a base which is in contact with the substrate whose area is comprised between 50 µm$^2$ and 1 cm$^2$, preferably between 2500 µm$^2$ and 1 mm$^2$, and a height measured from this base comprised between 10 µm and 1 mm, preferably between 50 µm and 500 µm,
  the two facing and mutually parallel faces of the two pads are advantageously spaced apart by a distance comprised between 10 µm and 1 cm, preferably between 50 µm and 1 mm.

In this 2$^{nd}$ variant of the 2$^{nd}$ embodiment of the invention, a plurality of pads can be fixed on the 1$^{st}$ face of the cavity, each of these pads having a face facing the face of one of the pads of the plurality of pads which are fixed on the 2$^{nd}$ face of the cavity, said facing faces of the pads being all parallel to each other.

In this 2$^{nd}$ variant of the 2$^{nd}$ embodiment of the invention, the pads can be made of a ferromagnetic material selected from those described above. The substrate can advantageously be made of a material selected from those described above for the substrate.

In this 2$^{nd}$ variant of the 2$^{nd}$ embodiment of the invention, the pads may have been fixed on the 1$^{st}$ face and the 2$^{nd}$ face of the cavity by electrodeposition, cathodic sputtering or atomic layer deposition.

In these embodiments of the invention, a continuous layer made of ferromagnetic material may have been electrodeposited on at least part of the 1$^{st}$ face of the cavity and on at least part of the 2$^{nd}$ face of the cavity which is facing and parallel to the 1$^{st}$ face, as well as on one face of the bottom of the cavity connecting these 1$^{st}$ and 2$^{nd}$ faces of the cavity.

In step b) of the method according to the invention, the solution is deposited on the surface of the substrate or, as the case may be, within its cavity so that the pads are at least partially immersed. For example, the solution can be deposited with a dispenser, a pipette or a micropipette so as to deposit a determined volume of the solution.

The maximum height that the permanent or soft magnet obtained at the end of the producing method according to the invention can reach is the height of the portion of the pads that will have been immersed in the solution. In other words, if the pads are completely immersed in the solution in step b), the maximum height that the magnet of the permanent or soft magnet can reach is the height of the pads.

Indeed, the height of the permanent or soft magnet obtained at the end of the producing method according to the invention will depend in particular on the way in which steps b) to d) more precisely described below have been carried out, and in particular the number of times they will have been repeated. Of course, it is within the abilities of those skilled in the art to implement these steps to obtain the desired height of the permanent or soft magnet.

The height of the permanent or soft magnet obtained with the producing method according to the invention can be comprised between 10 µm and 1 mm.

In step c) of the method according to the invention, the substrate is placed in a magnetic field so that at least part of the set of objects is grouped together between two faces facing two pads towards the gradients of the positive magnetic field and is oriented in the direction of the magnetic field so as to form a permanent magnet. Thus, a magnetic field is applied to the entire substrate, magnetizing the pads of the substrate.

In step c), the magnetic field intensity may be comprised between 100 mT and 1 T, preferably between 400 mT and 1 T. Most preferably, the magnetic field intensity is 1 T.

During step c), the magnetic field can be constant over time or change over time. For example, the magnetic field can present stages and/or ramps over time.

When the magnetic field intensity is not constant over time, for example if it has stages, this has the advantage of better densifying the permanent or soft magnet during its production.

For example, the magnetic field intensity can go from 0 T to 1 T in 20 seconds with a ramp of 50 mT/s.

In another example, the magnetic field intensity can go from 0 T to 1 T in 400 s with 20 successive steps lasting 20 seconds, the intensity increasing by 50 mT between each step.

The magnetic field can be produced by an electromagnet (for example an electromagnet which is used for electronic paramagnetic resonance experiments).

The substrate can be placed in the magnetic field for a period comprised between 1 minute and 10 hours, preferably between 5 minutes and 1 hour.

During step c) at least part of the solvent in the solution is evaporated. Preferably, in step c), the magnetic field is maintained until the solvent has completely evaporated from the solution.

Then, at the end of step c), when the magnetic field has been stopped, optionally, one or more washes can be carried out during step d) of the method according to the invention with at least one solvent. The solvent can be selected from chloroform, toluene, anisole, mesitylene and chlorobenzene. This allows eliminating the dispersion solvent still present at the end of step c), in other words the dispersion solvent that would not have evaporated during step c).

Steps b) to c) or, as the case may be when the method comprises a washing step d), steps b) to d) as described above, can be repeated several times. For example, they can be repeated between 1 and 50 times, preferably between 1 and 10 times.

Preferably, before each new deposit of solution in accordance with step b), the magnetic field is stopped or reduced to an intensity less than 10 mT so as not to reduce the magnetic properties of the permanent or soft magnet during producing.

At the end of step c), or as the case may be at the end of step d), one can optionally carry out a step e) which consists in the total evaporation of the solvents (namely the solvent of the solution and any washing solvents).

Step e) of evaporation can be carried out by applying a magnetic field whose intensity is comprised between 100 mT and 1 T, preferably between 400 mT and 1 T, and this for a period comprised between 1 minute and 10 hours, preferably between 1 minute and 1 hour. The duration of the evaporation will depend on the solvent to be evaporated. In an embodiment of the invention in which the solvent to be evaporated is chloroform, the magnetic field intensity can be 1 T and the duration can be 5 minutes.

Evaporation step e) can be controlled:
by acting on the temperature of the substrate (which can be adjusted in particular with a Peltier module),
by controlling the ambient pressure (for example by setting up a partial vacuum with a diaphragm pump for example).

Moreover, the lower the boiling point of the dispersing solvent, the easier it will be to evaporate it namely in step c) or in step e) with the washing solvent.

In the embodiments of the invention in which the permanent or soft magnet is produced within a cavity between two pads which each have a base which is in contact with the substrate and whose area is comprised between 0.01 mm² and 1000 mm² (preferably between 0.05 mm² and 50 mm²) and a height measured from this base comprised between 100 μm and 5 mm (preferably between 500 μm and 1 mm), the permanent or soft magnet can be recovered without difficulty at the end of the producing method according to the invention. As explained above, in these embodiments of the invention, the permanent or soft magnet is produced outside of the device in which it will be integrated.

In the embodiments of the invention in which the permanent or soft magnet is intended to remain integrated on the substrate (for example part of a MEMS or of a magneto-optical device for a permanent magnet), it can be implemented a step of removing the pads. For example, this step can consist of chemical etching, in particular if the pads have been fixed by electrodeposition.

Of course, removing the pads is not mandatory. Indeed, in cases where the permanent magnet is integrated within a MEMS or a magneto-optical device, the pads can be kept attached to these types of substrate without this preventing their proper functioning.

It is important to note that the method for producing a permanent magnet according to the invention can be perfectly integrated into a conventional microelectronic method, in particular during the production and within a MAGMEMS, a magneto-optical device, a fluidic chip or a biochip with magnetic function.

The subject of the invention is also a device selected from a MAGMEMS, a magneto-optical device, a microelectronic component, a high-frequency component, a fluidic chip or a biochip with magnetic function which is characterized in that it comprises:
at least one permanent or soft magnet obtained according to the producing method according to the invention as described above;
at least one substrate;
at least one $1^{st}$ pad and one $2^{nd}$ pad which are made of a ferromagnetic material and which are fixed to the surface or within a cavity that said substrate may have, said $1^{st}$ pad includes a face facing and parallel to a face that the $2^{nd}$ pad includes,
said permanent or soft magnet is located between said facing and mutually parallel faces of the $1^{st}$ and $2^{nd}$ pads.

The characteristics of the substrate, of the $1^{st}$ and of the $2^{nd}$ pads can be those which have been described above for the $1^{st}$ embodiment and the $2^{nd}$ variant of the $2^{nd}$ embodiment of the producing method according to the invention.

The MAGMEMS can be selected from any type of MEMS sensor and actuator with electromagnetic transduction. For example, it can be a magnetic field sensor, an energy collector or a relay.

These MAGMEMS can be used in a wide variety of applications: in microbiology, in particular for microfluidic magnetic separation (for example biosensors), in telecommunications (for example radiofrequency micro-switches) and in automotive sensors.

The magneto-optical device can be selected from magneto-optical sensors (for example fiber optic sensors, rotary sensors, and polarimetric sensors), baffles, modulators (for example microwave modulators) and non-reciprocal components (for example insulators and circulators).

The invention will be better understood with the aid of the detailed description of experiments which are set out below with reference to the appended drawing representing results of experimental data relating to the producing method according to the invention.

DESCRIPTION OF FIGURES

FIG. 1 is a schematic perspective representation of a silicon substrate to which two nickel pads are attached.

FIG. 2 is a photograph taken with a scanning electron microscope (hereinafter abbreviated «SEM») of a $1^{st}$ «nickel pad/cobalt permanent magnet/nickel pad» structure which was taken at the end of a $1^{st}$ implementation of the producing method according to the invention.

FIG. 3 is a graph of profilometric measurements of nickel and cobalt of this $1^{st}$ structure.

FIG. 4 is a photograph taken with a SEM of a $2^{nd}$ «nickel pad/cobalt permanent magnet/nickel pad» structure which was taken at the end of a $2^{nd}$ implementation of the producing method according to the invention.

FIG. 5 is a graph of profilometric measurements of nickel and cobalt of this $2^{nd}$ structure.

FIG. 6 is a graph representing the hysteresis curves of these $1^{st}$ and $2^{nd}$ structures, as well as a reference permanent magnet.

FIG. 7 represents a graph of the evolution of the magnetic induction and the amplitude of vibration of a MEMS resonator of the $1^{st}$ structure.

FIG. 8 represents a graph of the evolution of the magnetic induction and the amplitude of vibration of a MEMS resonator of the $2^{nd}$ structure.

FIG. 9 is a schematic perspective representation of a silicon substrate to which nickel pads are attached.

FIG. 10 is a photograph taken with a SEM of cobalt in a permanent magnet which was taken after a $3^{rd}$ implementation of the producing method according to the invention.

FIG. 11 is a graph of profilometric measurements of nickel and cobalt of a $3^{rd}$ «nickel pad/cobalt permanent magnet/nickel pad» structure obtained at the end of this $3^{rd}$ implementation of the producing method according to invention.

FIG. 12 is a schematic perspective representation of a PTFE substrate in which a cavity has been made and within which are fixed two steel pads.

FIG. 13 is a graph representing the demagnetization curves of the cobalt permanent magnet obtained according to a 4$^{th}$ implementation of the producing method according to the invention, as well as that of a reference permanent magnet.

FIG. 14 represents a graph of the evolution of the magnetic induction and the amplitude of vibration of a MEMS resonator of the cobalt permanent magnet obtained according to this 4$^{th}$ implementation of the producing method according to the invention.

FIG. 15 is a schematic perspective representation of a substrate which has a cavity within which pads are attached.

FIG. 16 is a sectional view along the plane P of FIG. 15 of the substrate.

FIG. 17 is a photograph taken with a SEM of a «nickel pad/iron carbide soft magnet/nickel pad» structure which was taken at the end of a 5$^{th}$ implementation of the producing method according to the invention, FIG. 18 is a photograph taken with a SEM of the iron carbide nanoparticles of a soft magnet which was taken at the end of the 5$^{th}$ implementation of the producing method according to the invention, FIG. 19 is a graph representing the hysteresis curves of the soft magnet obtained at the end of the 5$^{th}$ implementation of the producing method according to the invention.

EXPERIMENTAL PART

A: 1$^{st}$ series of experiments:

A—I—Carrying Out Step a) of the Producing Method According to the Invention: Preparation of Cobalt Nano-Rods:

540 mg of cobalt nano-rods dispersed in 120 mL of 1,2-butanediol were obtained from the synthesis method described in the aforementioned publication: Soumare et al., Dating from 2009, entitled: «Kinetically controlled synthesis of hexagonally close-packed cobalt nanorods with high magnetic coercivity», Advanced Functional Materials, 19, 1971-1977. This corresponded to a molar concentration of cobalt of 0.08 mol/L.

A volume of 10 mL of solution was taken, then washed in order to remove residues from synthesis and excess ligands.

More precisely, the washing was carried out as follows: a volume of 10 ml of solvent (ethanol or chloroform) was added. The obtained solution was mechanically stirred for 20 seconds, then placed in an ultrasonic bath for 5 minutes. The particles were magnetically attracted and the supernatant was removed. These steps were repeated 4 times: 2 times with ethanol, then 2 times with chloroform.

After washing, the cobalt nano-rods were redispersed in 300 μL of anisole, so as to obtain an anisole solution containing cobalt nano-rods with a molar concentration of 2.7 mol/L.

Producing and Fixing of Pads on Substrates:

Two substrates were available which were square silicon wafers of 1 cm wide and 500 μm thick.

On the 1$^{st}$ silicon wafer were fixed two nickel pads according to a 1$^{st}$ embodiment.

On the 2$^{nd}$ silicon wafer were fixed two nickel pads according to a 2$^{nd}$ embodiment.

1$^{st}$ embodiment of the pads:

The fixing on the silicon wafer of nickel pads according to the 1$^{st}$ embodiment was carried out as follows:

A layer of titanium 50 nm thick, then a layer of copper 400 nm were deposited on the silicon wafer by sputtering.

Then, a layer approximately 200 μm thick of the resin marketed under the trade name WBR™ 2100 by the company DuPont, which is a photoresist resin, was deposited by lamination on the copper layer.

The resin was exposed by photolithography and developed to obtain wells corresponding to two rectangles:
of a width «l» of 500 μm,
a length «L$_1$» of 100 μm,
spaced by a distance «d» of 500 μm.

Then, nickel was electrodeposited within these two rectangles, with the same thickness as the resin.

The resin was removed with an acetone bath.

The copper and titanium located outside the two rectangles were etched in a mixture of hydrogen peroxide (diluted to 1% by volume in deionized water) and sulfuric acid diluted to 1% by volume in deionized water.

A silicon wafer (namely the substrate) was thus obtained on which are fixed two nickel pads of parallelepiped shape by means of a tie layer consisting of the superposition of the titanium layer of 50 nm thickness and copper layer of 400 nm.

FIG. 1 represents schematically and in perspective this silicon wafer 1a on which are fixed the two nickel pads 2a of parallelepiped shape which have a width «l»: 500 μm, a length L$_1$: 100 μm and a height "h1": 168 μm and which are spaced by a distance «d» of 500 μm. The tie layer consisting of titanium and copper is not represented in FIG. 1.

As can be seen in FIG. 1, the direction of the magnetic field B is perpendicular to the facing faces of the 1$^{st}$ and 2$^{nd}$ pads 2a.

2$^{nd}$ embodiment of the pads:

The 2$^{nd}$ embodiment of the pads was produced in an identical manner to that described for the 1$^{st}$ embodiment except that the length was a length «L$_2$» of 1000 μm and the height was a height «h2» of 193 μm.

There was thus obtained a silicon wafer (namely the substrate) on which are fixed two nickel pads of parallelepiped shape by means of a tie layer consisting of the superposition of the titanium layer of 50 nm thickness and copper layer of 400 nm.

A—II—Carrying Out Steps b) to e) of the Producing Method According to the Invention:

The silicon wafer with the 1$^{st}$ embodiment of the pads thus obtained was washed with ethanol and acetone, dried with a nitrogen flow and then deposited at the bottom of a PTFE mold.

The mold was placed in an electromagnet which is used for electronic paramagnetic resonance experiments and which can generate a static magnetic field whose intensity can vary between 0 T and 1 T.

Then, the sequence of steps b) to d) of the producing method was repeated 8 times straight, as follows:
in step b), 10 μL of the anisole solution containing the cobalt nano-rods at a molar concentration of 2.7 mol/L were deposited on the silicon wafer.
in step c), a magnetic field of 1 T oriented in a direction parallel to the length L$_1$ was applied for 5 minutes. During this step c) some of the anisole was evaporated.
in step d), the silicon wafer was washed with 1 mL of chloroform which was injected into the mold by lateral flow so as to remove the excess anisole which has not been evaporated during step c) and the nano-rods which are not aligned between the two nickel pads.

Before each new repetition (that is to say before each new implementation of step b), the strength of the magnetic field was reduced to 0 T.

Then, at the end of these 8 repetitions of steps b) to d), in order to evaporate all of the anisole, a magnetic field of 1 T oriented in a direction parallel to the length $L_1$ was applied for 1 hour.

The manipulations described below were carried out identically for the $2^{nd}$ silicon wafer on which the pads according to the $2^{nd}$ embodiment are fixed, except that the sequences of steps b) to d) were repeated 7 times.

Thus, the producing method according to the invention was carried out:
- according to a $1^{st}$ implementation which resulted in a $1^{st}$ structure consisting of a $1^{st}$ permanent magnet in cobalt surrounded by two nickel pads;
- according to a $2^{nd}$ implementation which resulted in a $2^{nd}$ structure consisting of a $2^{nd}$ permanent cobalt magnet surrounded by two nickel pads.

The physical properties of these $1^{st}$ and $2^{nd}$ structures were studied and are detailed below.

A—III—Photographs and Profilometric Measurements:

FIGS. 2 and 4 are photographs taken with SEM of the $1^{st}$ and $2^{nd}$ structures as described above. These photographs were therefore taken at the end of a $1^{st}$ and a $2^{nd}$ implementation of the producing method according to the invention.

The photograph of FIG. 2 was taken with a magnification of 150 times and the photograph of FIG. 4 with a magnification of 43 times with a SEM marketed by the company JEOL under the trade name JSM-7800 F.

In FIG. 2, part of the $1^{st}$ silicon wafer 1a, the nickel pads 2a, as well as the $1^{st}$ permanent magnet 3a which results from the grouping of the cobalt nano-rods between these two pads 2a, which are spaced apart by a distance «d» are discerned.

In FIG. 4, part of the $2^{nd}$ silicon wafer 1b, the nickel pads 2b, as well as the $2^{nd}$ permanent magnet 3b which results from the grouping of the cobalt nano-rods between these two pads 2b which are spaced apart by a distance «d» are discerned.

Profilometric measurements were carried out with a mechanical profilometer sold by the company KLA TEN-COR under the trade name P-17.

The profilometric measurements were carried out:
- on one of the nickel pads 2a at the location indicated by a continuous segment in FIG. 2;
- on the $1^{st}$ permanent magnet 3a at the location indicated by a dotted segment in FIG. 2;
- on one of the nickel pads 2b at the location indicated by a continuous segment in FIG. 4;
- on the $2^{nd}$ permanent magnet 3b at the location indicated by a dotted segment in FIG. 4.

These measurements were thus carried out on the width of the nickel pads and the width of the two permanent magnets obtained at the end of the producing method.

FIG. 3 is a graph representing the evolutions of:
- the height of the nickel pad 2a as a function of the distance measured from a distance of 300 μm from the end of said pad 2a (continuous curve);
- the height of the $1^{st}$ permanent magnet 3a as a function of the distance measured from a distance of 300 μm from the end of said magnet 3a (dotted curve).

FIG. 5 is a graph representing the evolutions of:
- the height of the nickel pad 2b as a function of the distance measured from a distance of 220 μm from the end of said pad 2b (continuous curve);
- the height of the $2^{nd}$ permanent magnet 3b as a function of the distance measured from a distance of 220 μm from the end of said magnet 3b (dotted curve).

In view of FIGS. 3 and 5, it is noted that the shape of the profiles of the $1^{st}$ and $2^{nd}$ permanent magnets 3a, 3b is similar to that of the profiles respectively of the nickel pads 2a and 2b.

Indeed, for the two permanent magnets 3a, 3b, it is noted:
- a slight decrease in their width (which is 430 μm) relative to that of the nickel pads which is 500 μm.
- a height of 144 μm for the $1^{st}$ permanent magnet 3a close to that of the nickel pad 2a which is 168 μm,
- a height of 140 μm for the $2^{nd}$ permanent magnet 3b close to that of the nickel pad 2b which is 193 μm.

A—IV—Magnetic Characterizations of the $1^{st}$ and $2^{nd}$ «nickel Pad/Permanent Magnet in Cobalt/Nickel Pad» Structures:

A magnetometric measurement was carried out in order to determine the magnetic properties at ambient temperature of the $1^{st}$ and $2^{nd}$ «nickel pad/permanent magnet in cobalt/nickel pad» structures as described above.

FIG. 6 represents the hysteresis cycles of:
- the $1^{st}$ structure (Curve in very tight dotted lines);
- the $2^{nd}$ structure (dotted curve);
- a so-called «reference» magnet (continuous curve).

The reference magnet was obtained in a PTFE mold from the dispersion in 300 μL of chloroform of 2 mg of cobalt nano-rods produced according to the synthesis described above, then dried at room temperature in a magnetic field of 1 T generated by an electromagnet in a PTFE mold.

Unlike the permanent magnets of the $1^{st}$ and $2^{nd}$ structures, this reference magnet was not spatially structured. The cobalt nano-rods simply spread over the entire surface of the mold and aligned according to the direction of the applied magnetic field. There was therefore no structuring of the nano-rods so as to form a structured volume as is the case with the producing method according to the invention. Thus, the hysteresis cycle of the reference magnet corresponds to the intrinsic magnetic properties of cobalt nano-rods.

Table 1 below details the determined values of the coercive field $H_c$ (in kA/m) and of the remanent magnetization $\mu_0 M_r$ (in mT) for the $1^{st}$ and $2^{nd}$ structures, as well as for the reference magnet.

TABLE 1

|  | $\mu_0 Mr$ (mT) | $H_c$ (kA/m) |
|---|---|---|
| $1^{st}$ structure | 440 | 250 |
| $2^{nd}$ structure | 248 | 26 |
| reference magnet | 780 | 330 |

Table 1 Detailing the Magnetic Properties of the $1^{st}$ and $2^{nd}$ Structures and of the Reference Magnet The significant differences in magnetic properties noted in Table 1 and in FIG. 6 between the $1^{st}$ and $2^{nd}$ structures are mainly explained by the different amount of nickel present in these structures. Nickel is a soft ferromagnetic material with a very low coercive field (0.1 kA/m). The pads 2b which were used for the production of the $2^{nd}$ permanent magnet 3b had a volume 10 times greater than the pads 2a; which contributed to greatly reducing the magnetic properties of this $2^{nd}$ permanent magnet 3b.

In order to optimize the magnetic properties of such structures, the length L of the nickel pads should therefore be minimized. For technological reasons linked to the electrodeposition, the minimum value of the length «L» corresponds to a quarter of the height «h» of the nickel pad, that is to say for the case of this $1^{st}$ series of experiments for a thickness of approximately 200 μm: a minimum length of 50 μm.

The magnetic properties thus obtained for the $1^{st}$ and $2^{nd}$ structures are very satisfactory, in particular for the integration of the permanent magnets which they include within devices such as MAGMEMS and magneto-optical devices.

Admittedly, it is noted that the magnetic properties of the $1^{st}$ and $2^{nd}$ structures which were obtained at the end of the producing method according to the invention are weaker than those of the reference magnet which, it should be remembered, correspond to the intrinsic properties of cobalt nano-rods.

In order to improve the magnetic properties of these structures and so that they approach those of the reference magnet, it would be possible to change the nature of the ferromagnetic material of the pads, for example by using an alloy of nickel and iron (for example permalloy) or an alloy of cobalt, nickel, manganese and phosphorus. This would make it possible to modulate the radiated magnetic induction by playing on the magnetization and the coercivity of the pads.

Furthermore, the magnetic properties of these $1^{st}$ and $2^{nd}$ structures being reduced by the presence of the nickel pads, the etching of the latter would make it possible to have permanent magnets without nickel and therefore improve the magnetic properties.

Finally, it should be noted that the weaker magnetic properties of the $1^{st}$ and $2^{nd}$ structures compared to those of the reference magnet are also explained by the differences in shape.

Indeed, the hysteresis cycle of the reference magnet corresponds to a thin layer in view of its lateral dimensions. The demagnetizing field, that is to say the field produced by the magnet inside it, can therefore be considered as zero. The intrinsic properties of the material are then obtained. On the other hand, this type of thin film cannot be considered as a magnet, because no field is radiated outside the film.

In the case of the $1^{st}$ and $2^{nd}$ structures obtained at the end of the producing method according to the invention, the sample is no longer only subjected to the magnetic field applied by the magnetometer, but also to its own demagnetizing field. This results in a decrease in magnetization within the structure, but also in the generation of an external generated field; which is perfectly suitable and exploitable for MAGMEMS and magneto-optical devices.

A—V—Evaluation of the Magnetic Performance of Permanent Magnets Obtained with the Producing Method According to the Invention A—V—a—Magnetic Induction Measurement by Hall Microprobe The magnetic induction generated by the $1^{st}$ and $2^{nd}$ structures was measured using a magnetic field sensor.

Specifically, a Hall effect microprobe was instrumented using an electronics assembly and an NI-6341 acquisition board. This magnetic sensor works like this thanks to the Hall effect. A pair of electrodes is continuously polarized. The presence of a magnetic field perpendicular to the surface of the Hall cross deflects some of the charges, creating a potential difference measured at the second pair of electrodes. The Hall cross is 10 μm wide, which allows a local measurement of the magnetic induction generated by the permanent magnets.

The measurements carried out are magnetic induction profiles, that is to say that the magnet has been approached (up to a hundred micrometers) of the microprobe, using a displacement plate, at the level of the center of the permanent magnet, that is to say at the position where the magnetic induction is maximum. Then, the sample was moved away from the microprobe. A value of the magnetic induction was recovered using a LabView program for each position.

A—V—b—Actuation of MEMS Resonant Devices

The performances of the $1^{st}$ and $2^{nd}$ structures were also measured via their ability to actuate MEMS devices. These were resonators, in the form of a lever arm, which vibrate thanks to the Lorentz force produced by the passage of an alternating current perpendicular to a static magnetic field. To do this, the magnet was brought close to this MEMS up to a maximum distance of around one hundred micrometers (to avoid any risk of damage).

The MEMS used consisted of a lever arm of 285 μm wide and 1430 μm length.

The MEMS resonance amplitude was measured using piezoresistors implanted in the embedding of the structure.

The deflection of the lever arm generates a maximum constraint variation at this location. This changes the resistance of the piezoresistor, which is converted into a voltage and measured using an electronic circuit and an acquisition card.

A—V—c—Numerical Simulation

Furthermore, the magnetic induction of these $1^{st}$ and $2^{nd}$ structures was simulated using Comsol Multiphysics software, taking into account cobalt volume fractions of 25%, 30% and 50% as parameters.

The comparison of the evolution of the curve of the magnetic induction obtained experimentally with the Hall effect microprobe on the $1^{st}$ and $2^{nd}$ structures with those of the simulations obtained with different volume fractions in cobalt makes it possible to have an estimate of the volume fraction of cobalt in the permanent magnet of the considered structure. Indeed, when the curve of the magnetic induction obtained experimentally from a structure is close to a curve of the simulated magnetic induction with a given value of the volume fraction in cobalt, this means that the volume fraction in cobalt in the permanent magnet of this structure is close to this given value.

Also, the higher the volume fraction of cobalt, the better the magnetic properties of the permanent magnet of the structure. In particular, a cobalt volume fraction of 50% is quite advantageous. Therefore, the values of the cobalt volume fractions of 25%, 30% and 50% were selected to simulate magnetic induction.

A—V—d—Results

In FIG. 7 are represented:
- the evolution of the magnetic induction of the $1^{st}$ structure as a function of the distance between the center of the permanent magnet 3a and the microprobe («squares filled in black»);
- the simulated evolution of the magnetic induction of the $1^{st}$ structure by taking into account a volume fraction of 25% of cobalt as a function of the distance between the center of the permanent magnet 3a and the microprobe («continuous curve»);
- the simulated evolution of the magnetic induction of the $1^{st}$ structure by taking into account a volume fraction of 50% of cobalt as a function of the distance between the center of the permanent magnet 3a and the microprobe («point curve»);
- the evolution of the vibration amplitude of the MEMS resonator with the $1^{st}$ structure as a function of the distance between the center of the permanent magnet 3a and the MEMS («squares with black outline»).

In FIG. 8 are represented:

the evolution of the magnetic induction of the $2^{nd}$ structure as a function of the distance between the center of the permanent magnet $3b$ and the microprobe («squares filled in black»);

the simulated evolution of the magnetic induction of the $2^{nd}$ structure by taking into account a volume fraction of 30% of cobalt as a function of the distance between the center of the permanent magnet $3b$ and the microprobe («continuous curve»);

the simulated evolution of the magnetic induction of the $2^{nd}$ structure by taking into account a volume fraction of 50% of cobalt as a function of the distance between the center of the permanent magnet $3a$ and the microprobe («point curve»);

the evolution of the vibration amplitude of the MEMS resonator with the $2^{nd}$ structure as a function of the distance between the center of the permanent magnet $3b$ and the MEMS («squares with black outline»).

In view of FIGS. 7 and 8, it is noted that the magnetic induction measured at 130 μm from the center of the magnet is clearly greater for the $1^{st}$ structure compared to that of the $2^{nd}$ structures (26 mT vs 16 mT) and it decreases to reach a value similar to 500 μm (5.5 mT against 4 mT).

Furthermore, these values are lower than those expected for a magnet comprising a volume fraction of 50%. This can be explained by the fact that an amount of the anisole is not completely evaporated at the end of the producing method according to the invention, which resulted in inner porosity during drying. This can be solved by using other more volatile solvents and by controlling the densification of the permanent magnet, for example with the parameters of pressure and temperature.

Furthermore, it is noted that the vibration amplitude of the MEMS resonator decreases in the same way as the measured magnetic induction. This confirms that the cobalt permanent magnets of these $1^{st}$ and $2^{nd}$ structures provide sufficient energy to actuate MEMS devices.

The superposition of the magnetic induction curves (squares filled in black) and those of the vibration amplitude (squares with black outline) validates that the actuation is indeed generated by the presence of a permanent magnet.

B: $2^{nd}$ series of experiments:

B—I—Carrying Out Step a) of the Producing Method According to the Invention:

Preparation of Cobalt Nano-Rods:

The nano-rods were prepared in the same way as in part A-I relating to the 1st series of experiments.

3 mL of suspension were taken. After washing, the cobalt nano-rods were redispersed in 360 μL of anisole, so as to obtain an anisole solution containing cobalt nano-rods at a molar concentration of 0.66 mol/L.

Producing and Fixing of Pads on a Substrate:

A substrate was available which was a square silicon wafer of 1 cm wide and 500 μm thick.

160 nickel pads were fixed on the silicon wafer by electrodeposition. A layer of titanium 50 nm thick, then a layer of copper of 400 nm thick were deposited on the silicon wafer by sputtering.

Then, a layer of about 30 μm thick of the resin marketed under the trade name AZ® 40 XT by the company Micro-Chemicals GmbH, which is a photoresist resin, was deposited by spinning on the copper layer.

The resin was exposed by photolithography and developed to obtain wells corresponding to two rectangles:

of a width «I» of 100 μm, a length «$L_1$» of 100 μm, spaced by a distance «d» of 100 μm.

Then, nickel was electrodeposited within these two rectangles, with the same thickness as the resin.

The resin was removed with an acetone bath.

The copper and titanium located outside the two rectangles were etched in a mixture of hydrogen peroxide (diluted to 1% by volume in deionized water) and sulfuric acid diluted to 1% by volume in deionized water.

There was thus obtained a silicon wafer (namely the substrate) on which are fixed 160 nickel pads of parallelepiped shape by means of a tie layer consisting of the superposition of the titanium layer of 50 nm thickness and copper layer of 400 nm.

Each pad was of parallelepiped shape with a square base of 100 μm side and a 24 μm thickness.

FIG. 9 schematically represents in perspective the silicon wafer $1c$ on which 160 nickel pads $2c$ are fixed.

More precisely, the pads $2c$ are distributed on the silicon wafer in two columns spaced apart from each other by 500 μm. Each column comprises 8 rows of 10 pads $2c$ which are spaced apart from each other on each row of 100 μm. Each row of pads is spaced apart by 500 μm.

B—II—Carrying Out Steps b) to e) of the Producing Method According to the Invention:

Steps b) to e) were carried out in the same way as in the $1^{st}$ series of experiments as detailed in part A-II above and were repeated twice.

Permanent magnets were thus obtained between the nickel pads according to the direction of the magnetic field which was applied.

B—III—Photographs and Profilometric Measurements:

FIG. 10 is a photograph taken with the SEM with the same apparatus described above at the end of the producing method according to the invention with a magnification of 50,000 times which was taken at the level of one of the permanent magnets thus obtained.

In this photograph the cobalt nano-rods are discerned and note that they are correctly aligned.

Profilometric measurements were carried out with a mechanical profilometer as described in the $1^{st}$ series of experiments.

These measurements were thus carried out over the width of two nickel pads in two consecutive rows and the width of the two permanent magnets obtained at the end of the producing method from these two pads.

FIG. 11 is a graph representing the evolutions of:

the height of the two nickel pads as a function of the distance measured from a distance of 50 μm from the end of one of these pads (continuous curve);

the height of the two permanent magnets as a function of the distance measured from a distance of 50 μm from the end of one of these magnets (dotted curve).

In view of FIG. 11, it is noted that the shape of the profiles of the two permanent magnets is similar to those of the nickel pads. There is a very slight decrease in the width of the two permanent magnets relative to the nickel pads (90 μm versus 100 μm) while the thickness of the permanent magnet is almost identical to that of the nickel pads (23 μm versus 24 μm).

C: 3$^{rd}$ series of experiments:

C—I—Carrying Out Step a) of the Producing Method According to the Invention: Preparation of Cobalt Nano-Rods:

The nano-rods were prepared in the same way as in part A-I relating to the 1st series of experiments.

After washing, the cobalt nano-rods were redispersed in 2.5 mL of chloroform, so as to obtain a chloroform solution containing cobalt nano-rods with a molar concentration of 0.13 mol/L.

Producing and Fixing of the Pads on a Substrate:

As represented in FIG. 12 schematically and in perspective, there was a substrate 1d which was a PTFE mold in the center of which was formed a cavity 4d.

The substrate 1d has a general parallelepipedal shape of 2 cm length, 2 cm width and 2 cm height in the center of which is formed a cavity 4d of generally parallelepiped shape, whose dimensions are as follows: 1 cm length, 1 cm width and 1 cm height.

The cavity 4d has a 1$^{st}$ face 5d facing a 2$^{nd}$ face 6d.

On the 1$^{st}$ face 5d is fixed a 1$^{st}$ pad 2d which is in the form of a cylindrical steel bar with a diameter of 1500 µm and a length of 6 mm.

On the 2$^{nd}$ face 6d is fixed a 2$^{nd}$ pad 2d which is in the form of a cylindrical steel bar with a diameter of 1500 µm and a length of 6 mm.

The free ends of the two pads 2d are 2 mm apart.

The two steel bars are embedded in the substrate 1d.

C—II—Carrying Out Steps b) to e) of the Producing Method According to the Invention:

The substrate 1d (namely the PTFE mold) with the two steel bars 2d was placed in an electromagnet. 1.2 mL of the chloroform solution containing cobalt nano-rods with a molar concentration of 0.13 mol/L was deposited within the cavity 4d so as to completely immerse the two steel bars 2d.

Then a 1 T magnetic field was applied. After 2 minutes, the excess chloroform was removed via a syringe, under a magnetic field.

The magnetic field was stopped after one hour allowing the chloroform residue to be completely evaporated.

The permanent magnet thus obtained was recovered using pliers, having previously removed one of the steel bars.

It had a cylindrical shape with a length of 2 mm. Its diameter is almost constant: at the ends of the permanent magnet it is 1.3 mm and in the center it is 1.1 mm.

C—III—Magnetic Characterizations of the Permanent Magnet:

A magnetometric measurement was carried out in order to determine the magnetic properties at room temperature of the permanent magnet obtained with the producing method according to the invention.

FIG. 13 represents the demagnetization curves of:

the permanent magnet obtained with the producing method according to the invention (continuous curve);

reference magnet as described in the 1$^{st}$ series of experiments (dotted curve).

Table 2 below details the determined values of the coercive field H$_c$ (in kA/m) and of the remanent magnetization µ$_0$M$_r$ (in mT) for each of these 2 magnets.

TABLE 2

|  | µ$_0$Mr (mT) | H$_c$ (kA/m) |
| --- | --- | --- |
| permanent magnet according to the invention | 745 | 382 |
| reference magnet | 768 | 400 |

Table 2 Detailing the Magnetic Properties of Magnets According to the Invention and for Reference The values of the coercive field H$_c$ (in kA/m) and of the remanent magnetization µ$_0$M$_r$ (in mT) of the reference magnet are slightly different from those of the reference magnet of the 1$^{st}$ series of experiments. This is explained by the intrinsic variations in the nature of the implemented cobalt nano-rods, as well as by the variations in their alignment to obtain the reference magnets during these 1$^{st}$ and 2$^{nd}$ series of experiments.

The drop in the remanent magnetization (from 768 mT to 745 mT) and the coercive field (from 400 kA/m to 382 kA/m) between the reference magnet and the permanent magnet obtained with the producing method according to the invention is weak. It can only be explained by taking into account the demagnetizing field in the permanent magnet according to the invention, which lowers its magnetization, but which allows the generation of a magnetic field outside it.

C—IV—Evaluation of the Magnetic Performance of Permanent Magnets Obtained with the Producing Method According to the Invention In FIG. 14 are represented:

the evolution of the magnetic induction of the permanent magnet as a function of the distance between the center of the permanent magnet and the microprobe («squares filled in black»);

the simulated evolution of the magnetic induction of the permanent magnet as a function of the distance between the center of the permanent magnet and the microprobe («continuous curve»);

the evolution of the vibration amplitude of the MEMS resonator with the permanent magnet as a function of the distance between the center of the permanent magnet and the MEMS («squares with black outline»).

From FIG. 14, it can be seen that the permanent magnet exhibits a magnetic induction of 155 mT at 70 µm and reaches 52 mT at 560 µm.

These values are higher than those obtained on the 1$^{st}$ and 2$^{nd}$ structures of the 1$^{st}$ series of experiments. Indeed, increasing the size of the permanent magnet allows reducing the decrease in magnetic induction at the exit of the magnet.

In addition, unlike the 1$^{st}$ and 2$^{nd}$ structures, the measurements were made for this permanent magnet in the absence of a soft ferromagnetic element (namely the pads) which reduces the magnetization of the permanent magnet.

The superposition of the magnetic induction curves (squares filled in black) and those of the vibration amplitude (squares with black outline) validates that the actuation is indeed generated by the presence of a permanent magnet.

FIG. 15 represents schematically and in perspective a substrate 1e which is a silicon wafer of parallelepiped shape. Within this plate 1e is formed a cavity 4e.

FIG. 16 is a sectional view along the plane P of FIG. 15 of the substrate

In FIG. 16, the 1$^{st}$ face 5e and the 2$^{nd}$ face 6e, the bottom face 7e of the cavity 4e, as well as two nickel pads 2e are visible. The two nickel pads 2e were obtained by electrodeposition a layer of nickel on the 1$^{st}$ face 5e, the 2$^{nd}$ face 6e and the bottom face 7e of the cavity 4e.

The producing method according to the invention can also be implemented with this substrate 1e which has a cavity within which two pads 2e are fixed. To do this, a solution containing a set of objects which possess a magnetic moment can be deposited within the cavity so as to totally or partially immerse the two pads 2e which have two facing faces. Then, a homogeneous magnetic field is applied so as to group together the objects which possess a magnetic moment between these two pads 2e and to orient them according to the direction of the magnetic field.

D: $4^{th}$ series of experiments:

D—I—Carrying Out Step a) of the Producing Method According to the Invention: Preparation of Spherical Iron Carbide Nanoparticles Iron carbide nanoparticles Fe2.2C are synthesized as reported in [S. S. Kale et al., "Iron carbide or iron carbide/cobalt nanoparticles for magnetically-induced CO2 hydrogenation over Ni/SiRAlOx catalysts," Catal. Sci. Technol., Vol. 9, no. 10, pp. 2601-2607, 2019]. They are spherical and have a diameter of 15 nm.

80 mg of iron carbide nanoparticles were obtained from the synthesis method. 20 mg were removed with a spatula and were dispersed in 1 mL of anisole, which corresponds to a molar concentration of about 3 mol/L.

1st Embodiment of the Pads:

In this 1st embodiment of the pads, there was a silicon wafer having an array of nickel pads. Each pad had a parallelepipedal shape with the following dimensions: a width of 100 µm, a length of 100 µm and a height of 25 µm; the pads were spaced by a distance of 100 µm.

The silicon wafer was washed with ethanol and acetone, dried with a flow of nitrogen and then placed in the bottom of a PTFE mold.

2nd Embodiment of the Pads:

In this $2^{nd}$ embodiment of the pads, there was a silicon wafer having two facing nickel pads. Each of the two pads had a parallelepipedal shape with the following dimensions: a width of 500 µm, a length of 200 µm and a height of 150 µm; the two pads were spaced by a distance of 100 µm.

The silicon wafer was washed with ethanol and acetone, dried with a flow of nitrogen and then placed in the bottom of a PTFE mold.

D—II—Carrying Out Steps b) to e) of the Producing Method According to the invention:

The PTFE mold with the silicon wafer carrying the $1^{st}$ embodiment of the pads was placed in an electromagnet which is used for electronic paramagnetic resonance experiments and which can generate a static magnetic field whose intensity can vary between 0 T and 1 T.

Then, the sequence of steps b) to d) of the producing method was repeated twice straight, as follows:

in step b), 10 µL of the anisole solution containing the iron carbide nanoparticles at a molar concentration of 3 mol/L were deposited on the silicon wafer.

in step c), a magnetic field of 1 T oriented in a direction parallel to the length of the pads was applied for 5 minutes. During this step c), some of the anisole has evaporated.

in step d), the silicon wafer was washed with 500 µL of chloroform which was injected into the mold by lateral flow so as to remove the excess anisole which has not evaporated during step c) and the iron carbide nanoparticles which are not aligned between two nickel pads.

Before each new repetition (that is to say before each new implementation of step b), the strength of the magnetic field was reduced to 0 T.

Then, at the end of these 2 repetitions of steps b) to d), in order to evaporate all of the anisole, a magnetic field of 1 T was applied for 15 min.

A 1st structure of a «nickel pads/iron carbide soft magnets/nickel pads» network is thus obtained.

The manipulations described above were carried out in an identical manner for the silicon wafer carrying the $2^{nd}$ embodiment of the pads, with the difference that the sequence of steps b) to d) of the producing method was repeated 8 times straight.

A $2^{nd}$ «nickel pad/iron carbide soft magnet/nickel pad» structure was thus obtained.

D—III—Shots of the 1st «Nickel Pads/Soft Iron Carbide Magnets/Nickel Pads» Network Structure FIG. 17 is a photograph taken by SEM of the $1^{st}$ «nickel pads/iron carbide soft magnets/nickel pads» network structure obtained at the end of the producing method according to the invention as described above. This photograph was taken with a magnification of 160 times with a SEM marketed by the company JEOL under the trade name JSM-7800 F.

In the figure, we can see the silicon wafer 1f, the regular parallelepipeds corresponding to the nickel pads 2f of 25 µm high, 100 µm wide and separated by a distance of 100 µm. It is also seen that the entire inter-pad space is filled with soft magnets 3c made of iron carbide nanoparticles, each soft magnet 3c having a height corresponding to the height of the nickel pads 2f.

FIG. 18 is a photograph taken with SEM of a soft magnet 3c located between two nickel pads of the 1st «nickel pads/iron carbide soft magnets/nickel pads» network structure of FIG. 17. This photograph was taken with a magnification of 300,000 times with an SEM marketed by the company JEOL under the trade name JSM-7800 F.

This photograph shows the organization of iron carbide nanoparticles as well as their high compactness.

D—IV—Magnetic Characterization of the 2nd «Nickel Pad/Iron Carbide Soft Magnet/Nickel Pad» Structure A measurement by magnetometry was carried out in order to determine the magnetic properties at ambient temperature (300° K) of the 2nd «nickel pad/iron carbide soft magnet/nickel pad» structure obtained at the end of the producing method according to the invention as described above.

FIG. 19 represents the magnetization hysteresis cycles of this 2nd «nickel pad/iron carbide soft magnet/nickel pad» structure, after removing the residual deposits at the end of the pads.

A coercive field $H_c$ of 17 kA/m is obtained, showing the soft character of this magnet.

The invention claimed is:

1. A method for producing a permanent or soft magnet, wherein it comprises at least the following steps:
a) providing:
a solution containing at least one solvent in which are dispersed a set of objects which possess a permanent magnetic moment;
a substrate; and
at least one 1st pad and one 2nd pad fixed to a surface of the substrate or provided within a cavity in the substrate, wherein the at least one 1st pad and one 2nd pad are made of a ferromagnetic material, said 1st pad includes a face facing a face which the 2nd pad includes, said facing faces being mutually parallel;
b) depositing the solution on the surface of the substrate or, if the at least one 1st pad and one 2nd pad are provided within a cavity in the substrate, within the cavity, so that the 1st and 2nd pads are at least partly immersed in said solution;

c) placing the substrate in an external magnetic field oriented in a direction perpendicular to the faces of the 1st pad and of the 2nd pad which are facing and parallel to each other so that at least part of the set of objects are grouped together between said face of the 1st pad and said face of the 2nd pad which are facing and parallel to each other and that each of the objects of the at least part of the set of objects are oriented in a same direction as the direction of the applied external magnetic field, so as to form a permanent or soft magnet;

d) optionally, at least one washing of the substrate is carried out with at least one solvent;

e) totally or partially evaporating the at least one dispersion solvent from the set of objects and from the at least one washing solvent if present, wherein the external magnetic field magnetizes the pads and the magnetized pads create magnetic field gradients leading to an attraction zone between the 1st pad and the 2nd pad.

2. The producing method according to claim 1, wherein the objects which possess a permanent magnetic moment are made of a metal selected from cobalt, iron, nickel or platinum, the carbides of these metals, the nitrides of these metals, considered alone or as a mixture thereof.

3. The producing method according to claim 1, wherein the objects are nano-objects.

4. The producing method according to claim 3, wherein said objects are cobalt nano-rods and the magnet is a permanent magnet.

5. The producing method according to claim 3, wherein said objects are spherical iron carbide nanoparticles and the magnet is a soft magnet.

6. The producing method according to claim 1, wherein the solvent in which are dispersed the set of objects which possess a permanent magnetic moment is selected from anisole, chloroform, toluene, chlorobenzene and mesitylene, considered alone or in mixtures thereof.

7. The producing method according to claim 1, wherein the concentration of objects which possess a permanent magnetic moment in the solution is comprised between $5 \times 10^{15}$ objects/L and $10^{18}$ objects/L.

8. The producing method according to claim 1, wherein the substrate is made of a material selected from silicon, glass, insoluble polymers in organic solvents, metals and silica.

9. The producing method according to claim 1, wherein the pads are made of a ferromagnetic material selected from nickel, cobalt, steel, alloys of nickel and iron, alloys of iron and cobalt, alloys of iron and platinum, alloys of cobalt and platinum, alloys of nickel and iron and alloys of nickel, cobalt, manganese and phosphorus, considered alone or as a mixture thereof.

10. The producing method according to claim 1, wherein the pads are attached to the surface of the substrate and wherein:

the substrate has a base having an area between 4 mm$^2$ and 2,500 cm$^2$ and a height measured from this base between 10 µm and 10 cm, the pads have a base which is fixed to the surface of the substrate and having an area between 50 µm$^2$ and 1 cm$^2$ and a height measured from this base between 10 µm and 1 mm, and the two facing faces and parallel to each other of the two pads are spaced by a distance between 10 µm and 1 cm.

11. The producing method according to claim 10, wherein between 2 and 100 pads are provided, each pad having at least one face facing a face of another pad, said facing faces being all parallel to each other.

12. The producing method according to claim 1, wherein the pads are fixed within a cavity that the substrate has and wherein:

the substrate has a base having an area between 1 mm$^2$ and 100 cm$^2$ and a height measured from this base between 1 mm and 10 cm, the substrate has at least one cavity having a volume between 1 mm$^3$ and 500 cm$^3$ and a depth between 1 mm and 10 cm, the pads have a base which is in contact with the substrate and having an area between 0.01 mm$^2$ and 1000 mm$^2$ and a height measured from this base between 100 µm and 5 mm, and the two facing faces and parallel to each other of the two pads are spaced by a distance between 100 µm and 10 mm.

13. The producing method according to claim 12, wherein the substrate is made of polytetrafluoroethylene and the pads have a cylindrical shape with a base having the shape of a disc which is fixed on the substrate within its cavity, said pads are made of steel.

14. The producing method according to claim 1, wherein the pads are fixed within a cavity that the substrate has and wherein:

the substrate has a base having an area between 4 mm$^2$ and 2,500 cm$^2$ and a height measured from this base between 10 µm and 10 cm, the substrate has at least one cavity having a volume between 500 µm$^3$ and 100 mm$^3$ and a depth between 10 µm and 1 mm, at least one 1st pad being fixed on a 1st face of the cavity and comprises a facing face and parallel to one face of a 2nd pad fixed on a 2nd face of the cavity, said pads have a base which is in contact with the substrate and having an area between 50 µm$^2$ and 1 cm$^2$ and a height measured from this base between 10 µm and 1 mm, and the two facing faces and parallel to each other of the two pads are spaced by a distance comprised between 10 µm and 1 cm.

15. The producing method according to claim 1, wherein the height of the permanent magnet obtained at the end of said producing method is comprised between 10 µm and 1 mm.

16. The producing method according to claim 1, wherein step c), the magnetic field intensity is comprised between 100 mT and 1 T.

* * * * *